United States Patent
Kirino et al.

[11] Patent Number: 5,814,400
[45] Date of Patent: Sep. 29, 1998

[54] MAGNETO-OPTICAL RECORDING MEDIUM AND METHOD

[75] Inventors: Fumiyoshi Kirino, Suginami-ku; Yoshinori Miyamura, Nishitama-gun; Junko Nakamura, Higashimatsuyama; Norio Ohta, Moriya; Masahiko Takahashi; Ryo Suzuki, both of Hachiouji, all of Japan

[73] Assignees: Hitachi, Ltd., Tokyo; Hitachi Maxell, Ltd., Osaka-fu, both of Japan

[21] Appl. No.: 702,936

[22] Filed: May 20, 1991

[30] Foreign Application Priority Data

| May 18, 1990 | [JP] | Japan | 2-126784 |
| Jun. 20, 1990 | [JP] | Japan | 2-159782 |
| Sep. 21, 1990 | [JP] | Japan | 2-250272 |
| Sep. 21, 1990 | [JP] | Japan | 2-250273 |

[51] Int. Cl.$^6$ .................................................. G11B 5/66
[52] U.S. Cl. ................ 428/332; 428/336; 428/694 ML; 428/694 SC; 428/694 LE; 428/694 MT; 428/694 RE; 428/694 MM; 428/694 EC; 428/61 J; 428/660; 428/668; 428/670; 428/678; 428/679; 428/691; 428/900; 360/131; 369/13; 369/288; 365/122
[58] Field of Search ...................................... 428/615, 660, 428/668, 670, 678, 679, 681, 694, 900, 694 ML, 694 SC, 694 LE, 694 MT, 694 RE, 694 MM, 694 EC, 332, 336; 360/131; 369/13, 288; 365/122

[56] References Cited

U.S. PATENT DOCUMENTS

| 4,789,606 | 12/1988 | Yamada et al. | 428/694 SC |
| 4,992,336 | 2/1991 | Yamamoto et al. | 428/635 |
| 5,082,749 | 1/1992 | Carciq | 428/699 |

FOREIGN PATENT DOCUMENTS

| 0108474 | 5/1984 | European Pat. Off. |
| 273636 | 11/1987 | Japan |

Primary Examiner—Leszek Kiliman
Attorney, Agent, or Firm—Antonelli, Terry, Stout & Kraus, LLP

[57] ABSTRACT

A magneto-optical recording medium comprises in combination: a magneto-optical recording layer capable of writing or erasing information by a laser beam and an external magnetic field and of reading the information by a Kerr effect; and a substrate having the magneto-optical recording layer formed thereon. The magneto-optical recording layer has at least two layers, including a first magneto-optical recording layer and a second magneto-optical recording layer which are magnetically coupled together. The first magneto-optical recording layer is a layer providing a greater magneto-optical effect in a short light wavelength range than the second magneto-optical recording layer though that having less perpendicular magnetic energy than this, as is provided on an irradiation side of the laser beam. It provides advantages in both the magneto-optical effect and perpendicular anisotropy in consideration of the thicknesses or compositions of the first and second magneto-optical recording layers.

41 Claims, 11 Drawing Sheets

1 μm

MAGNETO-OPTICAL RECORDING MEDIUM AND METHOD

BACKGROUND OF THE INVENTION

The present invention relates to a magneto-optical recording medium and method of writing, reading, and erasing with use of laser beam, and more particularly concerns a magneto-optical recording medium and method having high reliability with use of short wave laser beam and capable of writing in ultra high density and over-writing.

With recent development of advanced information societies, file memories of high density and large capacity have been increasingly needed. An attention is attracted to optical memories to meet the need. Many enterprising organizations have put into the market practical magneto-optical recording layer disks capable of rewriting the stored data in recent years following a reading only type and write once type. Numbers of research organizations now are developing them for higher performance characteristics. One of these includes further increase of the recording density. For this is promising a technique that forms micro recording domains with use of short wave light. It further has been proposed to make track pitches closer, to make intervals between the recording domains shorter, and to record information edges of the domains. In any of the proposals, it is effective to use short wave lights to increase the recording density. Some of the techniques may be used together.

However, the techniques includes a problem that the materials of the TbFeCo group used widely at present are decreased in the magneto-optical effect, particularly in the Kerr rotation angle. It is therefore difficult to keep the reliability as errors are caused in reading.

For solving the problem, materials of the Nd—Gd—Fe group were disclosed in the U.S. Pat. Ser. No. 4,695,514 as one of the magneto-optical recording materials having enough magneto-optical effects in response to short wave light. Nd—Fe—Co group materials also are desirable as the magneto-optical recording materials. These materials, however, are defective in the perpendicular anisotropy. To improve this, it was proposed to add to them Tb, Dy, Ho, Gd, or other elements which can induce the perpendicular anisotropy.

Also, it was proposed in recent years to use as the magneto-optical recording materials alternately laminated multi-layer structures of a noble metal element, such as Pt or Pd, and an iron group element, such as Fe or Co, of a few to several tens of Angstroms thick. As an example, there is known EP0304873A1which discloses a multi-layer structure in which Pt and Co are alternately laminated to form the magneto-optical recording layer.

Further, an exchange bond two-layer structure was reported in the Preliminary Lectures for the 37th Joint Meeting of Applied Physics Associations, issued on Mar. 28, 1990. It has a TbFe layer formed to 1000 Angstrom on a glass substrate. It also has a PtCo alloy or a multi-layer structure of Pt and Co formed thereon.

However, the prior art disclosed in the U.S. Pat. Ser. No. 4,695,514 mentioned above is disadvantageous in the stability of the recording domains as the magneto-optical recording layer has neither sufficient coercive force and temperature characteristics nor perpendicular magnetic energy.

The prior art related to the magneto-optical recording materials of the Nd—Fe—Co group mentioned above is disadvantageous in that it does not have a sufficient magneto-optical effect in a short wave range if Tb, Dy, Ho, Gd, or other elements for inducing the perpendicular anisotropy are added to the magneto-optical recording materials to obtain sufficient perpendicular anisotropy.

The above mentioned prior art reported in EP0304873A1 which has the multi-layer structure in which the noble metal element Pt or Pd and the iron group element Fe or Co are alternately laminated to form the magneto-optical recording layer, is disadvantageous in that the magneto-optical recording layer has not sufficient perpendicular anisotropy and has too low a coersive force of several tens to hundreds of Oersteds to stably keep the information recorded.

The above-mentioned prior art reported in the Preliminary Lectures contains descriptions of such a first magneto-optical recording layer as described in the present invention which is formed of Pt and Co to multi-layer structure (the layer thickness ratio is 17 to 5 Angstrom) and such a second magneto-optical recording layer of 1000 angstrom thick. Yet it has no description about the relationship between thicknesses of the first and second magneto-optical recording layers. We therefore cannot see in what conditions the Kerr rotation angle θk and the Faraday effect or perpendicular magnetic energy Ku can be made greater.

The magneto-optical recording medium according to the present invention can prevent the Kerr rotation angle from decreasing at short waves in the second magneto-optical recording layer in a way that the total thickness of the first and second magneto-optical recording layers is made so as not to allow the read light to transmit.

Alternatively, the magneto-optical recording medium is made so that the read light can transmit the first and second magneto-optical recording layers. This is effective particularly in increase of the Faraday effect. If an additional reflection layer is provided, a multiple light effect is obtained by reflection of the light. The recording domains which become smaller in the short wave region likely cause high noise so that a severe heat resistance is required. The reflection layer can disperse the heat so that the over-write domains can be made superior.

The prior art reported in the Preliminary Lectures can make the multi-layer structure of the platinum group element and the iron group element increase the magneto-optical effect (Kerr rotation angle θk). It, however, cannot increase the perpendicular magnetic energy Ku. To increase the Kerr rotation angle θk, the layer has to be thicker. With the thick layer, the perpendicular magnetic energy Ku is limited to a certain range, so that no perpendicular magnetization cannot be made in all.

On the other hand, the magneto-optical recording medium according to the present invention has an alternately laminated layer of a layer of an iron group element having a platinum group element added thereto and the other layer of the platinum group element to increase both the Kerr rotation angle θk and perpendicular magnetic energy Ku, resulting in the perpendicular magnetized layer having an excellent magneto-optical effect. The reason for high perpendicular magnetic energy Ku seems that the stress of the iron group element layer can be increased by addition of the platinum group element.

There is another problem in the conventional materials with use of which a disk is made and recording, reading, and erasing are made. To over-write on the already recorded data, this has to be erased once before recording. This is disadvantageous because it takes a long time to access.

SUMMARY OF THE INVENTION

In view of the foregoing, it is a general object of the present invention to provide magneto-optical recording materials having excellent coersive force, perpendicular magnetic energy, and other magnetic characteristics to accomplish ultra high density magneto-optical recording. In other words, the present invention provides a magneto-optical recording medium which can have micro-recording regions formed in a magneto-optical recording layer thereof which can exist stably as perpendicular magnetization layer, have sufficiently high coersive force, superior temperature characteristics, and sufficiently high magneto-optical effect for a short wave light.

Briefly, the foregoing object is accomplished in accordance with aspects of the present invention by the following medium and features. The features of the present invention can be summarized as follows:

(1) magneto-optical recording medium comprising in combination: a magneto-optical recording layer capable of writing or erasing information by a laser beam and an external magnetic field and of reading the information by a Kerr effect; and a substrate having the magneto-optical recording layer formed thereon; characterized in that: the magneto-optical recording layer has at least two layers, including a first magneto-optical recording layer and a second magneto-optical recording layer which are magnetically coupled together; and the first magneto-optical recording layer is a layer providing a greater magneto-optical effect in a short light wavelength range than the second magneto-optical recording layer though that having less perpendicular magnetic energy than this, as is provided on an irradiation side of the laser beam.

(2) A magneto-optical recording medium according to feature (1) above wherein: the first magneto-optical recording layer is thick enough to be able to transmit a light in use for reading at least; and the first and second magneto-optical recording layers are thick in total not to transmit the light in use for reading.

(3) A magneto-optical recording medium according to feature (2), characterized in that: the first magneto-optical recording layer is not thicker than 500 Angstrom.

(4) A magneto-optical recording medium according to feature (1), further comprising: a recording layer having a large reflective rate and having a magneto-optical effect which is large as light wavelength is shorter, provided on a side of the second magneto-optical recording layer opposite to the other side facing the first magneto-optical recording layer.

(5) A magneto-optical recording medium according to feature (4), characterized in that: the first and second magneto-optical recording layers are thick in total enough to be able to transmit the light in use for reading.

(6) A magneto-optical recording medium according to feature (5), characterized in that: the first magneto-optical recording layer is not thicker than 500 Angstrom.

(7) A magneto-optical recording medium according to any of features (1) through (6), characterized in that: the first magneto-optical recording layer is formed of a material having less perpendicular magnetic energy than $10^5$ J/m$^3$.

(8) A magneto-optical recording medium according to any of features (1) through (6), characterized in that: he second magneto-optical recording layer is formed of a material having greater perpendicular magnetic energy than $10^5$ J/m$^3$.

(9) A magneto-optical recording medium according to any of features (1) through (6), characterized in that: the first magneto-optical recording layer is an alloy of at least one element selected from among Pd, Pt, and Rh with at least one element selected from among Fe, Co, Ni, and Mn.

(10) A magneto-optical recording medium according to any of any of features (1) through (6), characterized in that: the first magneto-optical recording layer is of multi-layer structure, wherein a layer of at least one element selected from among Pd, Pt, and Rh and the other layer of at least one element selected from among Fe, Co, Ni, and Mn are laminated alternately.

(11) A magneto-optical recording medium according to any of features (1) through (6), characterized in that: the first magneto-optical recording layer is an alloy of at least one element selected from among Nd, Pr, Sm, and Ce with at least one element selected from among Fe and Co.

(12) A magneto-optical recording medium according to any of features (1) through (6), characterized in that: the first magneto-optical recording layer is of multi-layer structure, wherein a layer of at least one element selected from among Nd, Pr, Sm, and Ce and the other layer of at least one element selected from among Fe and Co are laminated alternately.

(13) A magneto-optical recording medium according to any of features (1) through (6), characterized in that: the second magneto-optical recording layer is an alloy of at least one element selected from among Tb, Dy, Gd, and Ho with at least one element selected from among Fe and Co.

(14) A magneto-optical recording medium according to any of features (1) through (6), characterized in that: the second magneto-optical recording layer is of multi-layer structure, wherein a layer of at least one element selected from among Tb, Dy, Gd, and Ho and the other layer of at least one element selected from among Fe and Co are laminated alternately.

(15) A magneto-optical recording medium according to any of features (1) through (6), characterized in that: the second magneto-optical recording layer is an alloy of at least one element selected from among Tb, Dy, Gd, and Ho, with at least one element selected from among Fe and Co, and with at least one element selected from among Nb, Ti, Ta, Cr, Pt, Pd, and Rh.

(16) A magneto-optical recording medium according to any of features (1) through (6), characterized in that: the second magneto-optical recording layer is of multi-layer structure, wherein a layer of at least one element selected from among Tb, Dy, Gd, and Ho, another layer of at least one element selected from among Fe and Co, and the other layer of at least one element selected from among Nb, Ti, Ta, Cr, Pt, Pd, and Rh are laminated alternately.

The present invention makes use of a magneto-optical recording layer composed of at least a binary layer that can magnetically couple layers different in perpendicular anisotropy. The alternately laminated layer of Pt and Co and the magneto-optical recording layer of the Nd—Fe—Co group described previously, as examples, can have a sufficiently high magneto-optical effect. Their perpendicular magnetic energy, however, is around $10^4$ J/m$^3$ which is not sufficient. In order to induce the perpendicular anisotropy in those materials, the other material, such as the TbFeCo group which has perpendicular anisotropy as high as $10^5$ J/m$^3$ or more, is magnetically coupled with those materials having low perpendicular magnetic energy. In other words, the materials different in the perpendicular anisotropy are magnetically coupled together to induce the perpendicular anisotropy while holding the magneto-optical effect to a short wave light.

It is preferable for the first magneto-optical recording layer to use the layers of the materials described in features (9) through (12) above. With use of the alloy given in feature (9), the noble metal element Pd, Pt, or Rh should be preferably in the range of 1 to 15 at% of its whole composition. With use of the alloy given in feature (11), the rare earth element Nd, Pr, sm, or Ce should be preferably in the range of 15 to 35 at% of its whole composition. In this case, it may further have at least one element selected from among Tb, Dy, and Ho added thereinto. The elements Tb, Dy, and Ho should be preferably less than 50 at% of the all rare earth elements.

It is preferable for the second magneto-optical recording layer to use the layers of the materials described in features (13) through (15). With use of any of the alloys in features (13) and (15), the elements other than Fe and Co should be preferably in the range of 15 to 35 at% of the whole composition. For the alloy in feature (15), the element Tb, Dy, or Ho should be preferably more than 50 at% of the elements other than Fe and Co.

For the second magneto-optical recording layer can be used such materials as TbFeCo, DyFeCo, HoFeCo, GdFeCo, TbDyFeCo, TbHoFeCo, GdTbFeCo, GdDyFeCo, GdHoFeCo, and DyHoFeCo. For it, it is enough that the perpendicular magnetic energy should be higher than $10^5$ J/m$^3$. In other words, it is sufficient that $K\perp - 4\pi Ms^2$ should be positive. The saturated magnetization Ms of those materials are 100 to 200 emu/cc.

In the multi-layer structure in which the noble metal element of the above mentioned first magneto-optical recording layer and the iron group element are alternately laminated on each other, the thickness ratio of the layers should be preferably made as follows. A two-layer structure as the recording layer in which a rare earth-transition metal layer and a platinum-transition metal multi-layer structure are magnetically exchange coupled together, should be used, and the thickness ratio of the platinum layer and transition metal multi-layer structure should be in the range of 2 to 1 to 5 to 1. In particular, it is most effective that it should be 4 to 1. When only the alternately laminated multi-layer structure of Pt and Co have the perpendicular magnetic energy Ku and the coersive force Hc measured, both are maximum, $7 \times 10^4$ erg/cc and 1 kOe, respectively for the thickness ratio of 4 to 1 (20 to 5 Angstrom). In the range of 2to 1 (10 to 5 Angstrom) to 5 to 1 (25 to 5 Angstrom), the multi-layer structure should be exchange coupled with a rare earth-iron group amorphous alloy at higher than $5 \times 10^4$ emu/cc so that Ku and Hc can be increased. For the elements composing the rare earth-transition metal layer, should be used at least one element of Tb, Dy, and Ho. For the elements composing the platinum group-transition metal multi-layer structure, should be used at least one element of Pt, Pd, and Rh as the platinum group, and at least one element of Fe, Co, Ni and Mn as the transition metal should be used.

For the first magneto-optical recording layer, the perpendicular anisotropy can be controlled by adjusting the internal stress except for changing the layer thickness ratio. To do this, for example, the layer forming conditions should be controlled. If the sputtering technique is used, the sputtering gas pressure, kind of gas, rf power, and sputtering method can be controlled. The layer crystallization grain and amorphous state further can be controlled. For this, it is also effective to control the sputtering conditions.

For the first magneto-optical recording layer may be used another alternately laminated multi-layer structure or alloy layer of a rare earth element, such as Nd, Pr, Ce, or Sm, and an iron group element, such as Fe or Co except for the above mentioned alternately laminated multi-layer structure of platinum group element and iron group element. The multi-layer structure, like the alternately laminated multi-layer structure of platinum group element and iron group element, has to have the perpendicular anisotropy induced to become perpendicularly magnetized apparently by exchange coupling with a layer having high perpendicular magnetic energy as it has low perpendicular magnetic energy in itself. The multi-layer structure then has greater magneto-optical effect to the short wave light so that it can be a useful ultra high density magneto-optical recording material with use of the short wave light.

In the alternately laminated multi-layer structure of platinum group element and transition metal, the transition metal layer can be thinner than 10 Angstrom to make greater the coersive force of the alternately laminated multi-layer structure of platinum group-transition metal itself. This can stably record at well shaped micro-domains.

The total thickness of the exchange bond two-layer structure is made so as to transmit light. It can be made thinner than 500 Angstrom, and an additional metal reflection layer is provided on a side opposite to the light irradiation side so that the light transmitted through the recording layer can be returned to the recording layer again. This provides a light multiple enhancement effect to increase the Kerr rotation angle and the SN ratio.

Also, the alternately laminated multi-layer structure can be made thinner than 500 Angstrom. In this case, the second magneto-optical recording layer serves also as a reflection layer. Light then can be multiple enhanced in the first magneto-optical recording layer so that the Kerr rotation angle can be obtained sufficiently to provide necessary SN ratio. Thicknesses of the first magneto-optical recording layer, the second magneto-optical recording layer, and the whole magneto-optical recording layer are determined depending on the light wavelength used.

As described so far, the magneto-optical recording layers can be composed of at least two kinds of layer which are different in perpendicular magnetic energy so that the perpendicular anisotropy can also be induced in the layer having less perpendicular magnetic enegy apparently.

For the first magneto-optical recording layer, there can be used a multi-layer structure of Pt and Co which is composed of a multiple of couples of two layers laminated alternately, the Co layers of which contain at least one element selected from among Pt, Pd, Rh, Au, Nb, Ti, Ta, and Cr, and the other layers of at least one element selected from among Pt, Pd, Rh, and Au. This can increase the coersive force and the perpendicular anisotropy so that the material obtained is preferable for the ultra high density magneto-optical recording. Also, addition of an element(s) Pt, Pd, Rh, Au, Nb, Ti, Ta, and Cr into the iron group element can control the Curie temperature and the saturated magnetization as well as increase the perpendicular magnetic energy so that the disk characteristics can be controlled. Further, it is effective to increase the corrosion resistance of the layer.

In order to make a strong magnetic coupling between the first magneto-optical recording layer and the second magneto-optical recording layer in the above mentioned exchange coupling two-layer structure, care has to be taken in the atmosphere for forming the recording layer. The initial exhaust in forming the recording layer should be preferably lower than $10^{-6}$ to $10^{-7}$ Torr.

Further, in order to make a gradient in the perpendicular magnetic enegy between the first magneto-optical recording layer and the second magneto-optical recording layer, an additional layer having an intermediate perpendicular magnetic enegy between the both can be provided. The magnetic coupling force can be controlled by providing another additional oxide layer or nitride layer or by adjusting thickness of the noble metal element or iron group element layer close to the faces of the two recording layers in the alternately laminated multi-layer structure of noble metal element and iron group element.

A larger Kerr rotation angle can be obtained while a high perpendicular anisotropy is kept in the whole magneto-optical recording layer as follows. The second magneto-optical recording layer is formed on a side opposite to the light irradiation side of the first magneto-optical recording layer having large Kerr rotation angle at short wavelengths though having low perpendicular anisotropy. The thickness of both layers is adjusted so that light can be transmitted through. An additional light reflection layer also can be provided on the side opposite to the light irradiation side of the magneto-optical recording layer. If the light reflection layer is provided, it need hardly be said that the magneto-optical recording layer has to be adjusted to a thickness in which the light can be caused to make multiple enhancement. In this case, a dielectric matter of inorganic compound, such as $SiNx$, $SiO$, $AlN$, or the like which is optically transparent can be formed before the light reflection layer is made. For the light reflection layer there can be used Al, Pt, Au, Ag, Rh, Pd, Cr, or Cu as base material. This can have an additional passivating element, such as Nb, Ti, Ta, Cr, W, or Mo, contained to increase the corrosion resistance and control the thermal conductivity. It should be noted that controlling the thermal conductivity should be necessarily made to suppress possible change of the magnetic characteristics due to structural erasing by increase of the temperature of the magneto-optical recording layer in writing or erasing. That is, the heat is dispersed around to suppress the temperature increase at the center of the laser beam and to make the erase domain wider. This can increase the disk characteristic performance and reliability.

Also, for the light reflection layer which is formed directly on the magneto-optical recording layer there can be used an alternately laminated layer of a noble metal element and an iron group element, such as Pt and Co, Pd and Co, and Rh and Co, Pt and Fe, Pd and Fe, Pt and CoFe, Pd and CoFe, and Rh and CoFe, as well as the materials mentioned above. In this case, the alternately laminated layer can be provided to increase the Kerr rotation angle in the way that it can be magnetically coupled with the layer having large perpendicular anisotropy, for example, TbFeCo, as well as serving as the reflection layer.

Further, the first magneto-optical recording layer can be made thin enough to transmit light, and the second magneto-optical recording layer can be made thick so as not to be able to transmit light so that multiple enhancement can be caused in the first magneto-optical recording layer to increase the magneto-optical effect.

Temperature change of the coersive force which is important for the write, read, and erase characteristics depends on the characteristics of the second magneto-optical recording layer having the large perpendicular magnetic energy. The temperature change of the layer therefore should be controlled to obtain desired disk characteristics.

In order to further increase the disk characteristics, the first magneto-optical recording layer to be formed on the light irradiation side may have an inorganic compound layer, such as $SiNx$, $SiO$, or $AlN$, inserted to form an alternately laminated layer, like Pt, Co, $SiNx$, ..., NdFeCo, $SiNx$, In turn, the disk made of such materials can have an external switch magnetic field applied thereto with use of a floating magnetic head and, at the same time, have a continuous light irradiated to the magneto-optical recording layer to make over-write. Alternatively, control can be made in the magnetic characteristics of the first and second morls, particularly in the Curie temperature to change the intensity of the laser beam irradiated to make over-write.

As described so far, the ultra high density magneto-optical recording with capability of erasing is accomplished by the magneto-optical recording layer medium according to the present invention.

The second magneto-optical recording layer having a large perpendicular anisotropy can be provided so as to magnetically couple with the first magneto-optical recording layer having a high magneto-optical effect enough to short wave light though having low perpendicular magnetic enegy. This can induce the perpendicular anisotropy without decrease of the magneto-optical characteristics of the second magneto-optical recording layer. It also can be used to write, read, or erase the short wave light so as not decrease the Kerr rotation angle, but conversly increase it. This provides the read output enough to accomplish the ultra high density optical recording. In this case, the whole magneto-optical recording layer provides perpendicular anisotropy higher than $10^5$ $J/m^3$, enough to make the formed recording domains exist stably. This means that the recorded information can also be held for a long period of time, or involves no problem in its life.

The first magneto-optical recording layer can be made a multi-layer structure which has two layers laminated alternately, including a layer formed of at least one element selected from among Pt, Pd, Rh, and Au and the other layer of alloy of at least one base element selected from among Fe, Co, Ni, and Mn containing at least one element selected from among Pt, Pd, Rh, Au, Nb, Ti, Ta, and Cr. The elements added to Fe or Co can be selected to desired concentrations so that the coersinve force, the Curie temperature, perpendicular magnetic energy, and other magnetic characterisitcs can be controlled to desired values to obtain required disk characteristics. This is due to the fact that the addition of the elements to the Fe or Co can control the magnetic characteristics of the iron group elements.

In order to strengthen the exchange bond force between the two layers, the saturated magnetization of the platinum group-transition metal multi-layer structure should be less. However, the Kerr rotation angle is decreased with decrease of the saturated magnetization. The saturated magnetization has to be determined to a proper value, as can be changed by adjusting the thickness ratio of the platinum group layer to the transition metal layer. The ratio should be preferably in the range of 2 to 1 to 5 to 1. It should be most preferably at 4 to 1.

The coersive force of the multi-layer structure itself can be increased by making the thickness of the transition metal thinner than 10 Angstrom. This also can make the exchange bond force greater. The thickness ratio of Pt to Co should be most preferably 20 to 5 Angstrom.

Selection of the sputtering conditions, including the gas pressure, rf power, and kind of gas, can control the internal stress, crystallization grain size, amorphous state, and the like. This allows a desired perpendicular magnetic enegy to be obtained.

The floating magnetic head can externally apply a switching magnetic field to the magneto-optical recording layer, the laser beam can be irradiated to it so that over-write can be accomplished. Alternatively, in the multi-layer structure of a noble metal element and iron group element laminated alternately, the first magneto-optical recording layer and the second magneto-optical recording layer of amorphous alloy formed of a rare earth element and iron group element can be controlled in the magnetic characteristics, particularly in the temperature characteristic. The recording layer can be used together with an auxiliary magnetic field to modulate the intensity the laser beam irradiated so that the over-write can be accomplished. This successfully achieves increase of both the recording density and over-write.

BRIEF DESCRIPTION OF THE DRAWINGS

For a better understanding of the nature and scope of the present invention, reference should be had to the following drawings.

FIG. 16 (b) shows an example of the pit interference.

DETAILED DESCRIPTION OF THE PREFERRED EMBODIMENTS

The present invention is illustrated in further detail by the following embodiments.

Embodiment 1

Figure 1:
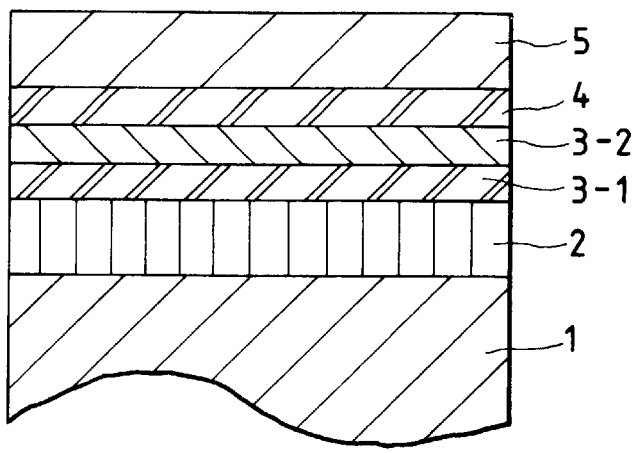
FIG. 1 is a schematic cross sectional representation of a first illustrative embodiment of the present invention for the magneto-optical recording medium (disk).

FIG. 1 is a schematic cross sectional representation of a first illustrative embodiment of the present invention for the magneto-optical recording medium (disk). A first inorganic compound layer 2 was formed of a $SiN_x$ layer on a substrate 1 having guide grooves (not shown) by the sputtering technique. As sputtering conditions, a mixed gas of Ar and $N_2$ in pressure ratio of 90 to 10 was used as sputtering gas, a Si sintered plate was as target, an rf power density was 6.5 $W/cm^2$, and a sputtering gas pressure was $1 \times 10^{-2}$ Torr. The layer thickness obtained was 550Angstrom, and the refractive index n was 2.05.

In turn, a first magneto-optical recording layer 3-1 was formed of an alternately laminated layer of Pt and Co by the sputtering technique. As sputtering conditions, Ar was used as sputtering gas, and Pt and Co were as targets. The technique used was a binary sputtering technique by which Pt and Co were sputtered at the same time using a dc power source. Layer thicknesses of Pt and Co were controlled with a sputtering power. In sputtering, rotation was 120 rpm, a sputtering gas pressure was $5 \times 10^{-3}$ Torr, and an rf power density was 5 $W/cm^2$. The layer thicknesses of Pt and Co were 12 and 8 Angstrom, respectively. A total thickness of the alternately laminated layer of Pt and Co was 200 Angstrom.

Alternatively, Xe was used in place of Ar as the sputtering gas. It could be observed that crystallization grain of each layer was grown. As a result, a perpendicular anisotropic energy was increased about 30% higher than that of Ar. A saturated magnetization was decreased about 30%. That is, selection of kind of sputtering gas allowed controlling of the magnetic characteristics.

In turn, a second magneto-optical recording layer 3-2 was formed of a layer of $Tb_{24}Fe_{61}Co_{12}Nb_3$ to a thickness of 250 Angstrom by the sputtering technique. As sputtering conditions, Ar was used as sputtering gas, and TbFeCoNb alloy was as target. A sputtering gas pressure was $5 \times 10^{-3}$ Torr, and an rf power density was 4.2 $W/cm^2$.

A response characteristic of a Kerr rotation angle to light wavelength can be changed by controlling the total thickness of the alternately laminated layer and that of each layer.

In turn, a second inorganic compound layer 4 was formed to a thickness of 100 Angstrom. Sputtering conditions are same as the ones for the first inorganic compound layer 2.

Finally, a light reflective layer 5 was formed of $Al_{85}Ti_{15}$ to 500 Angstrom thick by the sputtering technique. As sputtering conditions, Ar was used as sputtering gas, and Al-Ti alloy was as target. A sputtering gas pressure was $1 \times 10^{-2}$ Torr, and an rf power density was 3.6 W/cm$^2$.

Figure 2:
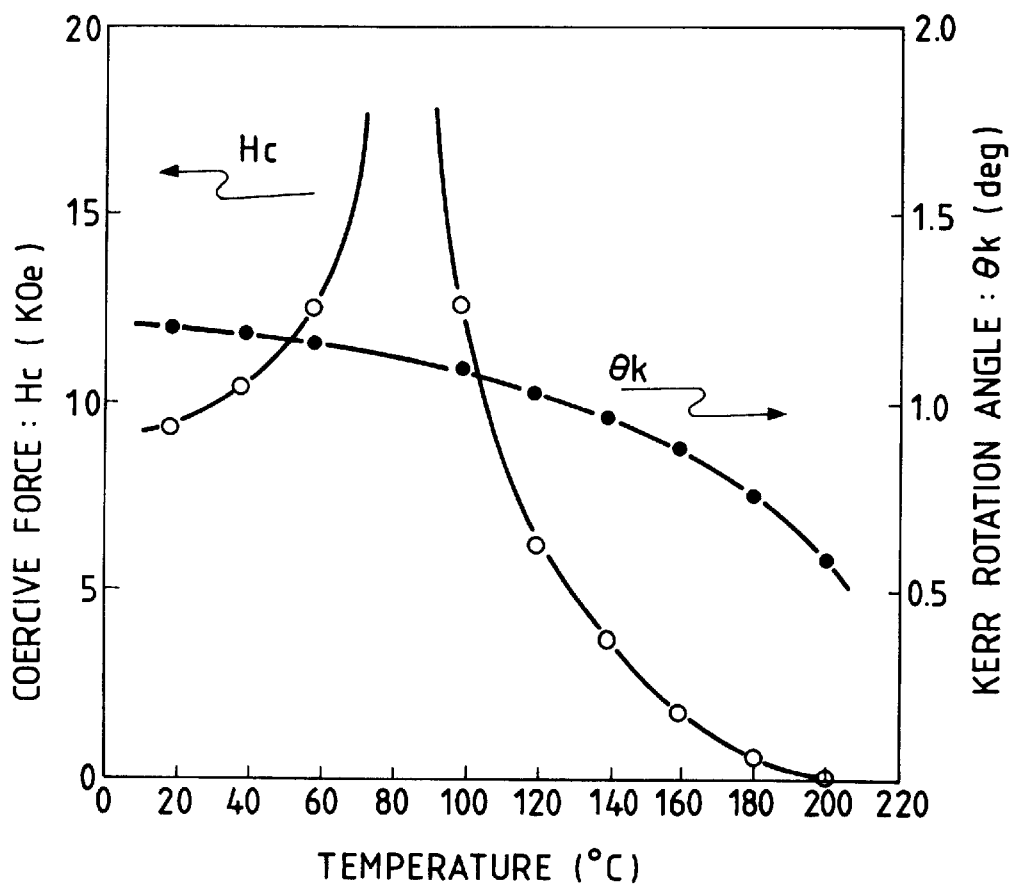
FIG. 2 shows a magnetic and magneto-optical temperature dependencies of the magneto-optical recording disk formed in the present first embodiment.

FIG. 2 shows the magnetic and magneto-optical temperature dependencies of the magneto-optical recording disk formed in the present first embodiment. The Kerr rotation angle θk was 1.2 degree with the light wavelength λ of 530 nm at room temperature, the coercive force Hc was 9.5 KOe, and the reflective index R was 18%. The coersive force Hc was increased with temperature, and exceeds beyond a measuring range of 20kOe around 80°C, which was a compensation temperature. When the temperature was further increased, the coersive force Hc became Fe-rich composition, decreased reversely, and became 0 around 200°C.

The Kerr rotation angle θk which was 1.2° at room temperature was gradually decreased with temperature, and was 0.6°.

This shows that the Kerr effect of the TbFeCoNb layer vanished, or is shown by the alternately laminated layer of Pt and Co. As the coersive force is near 0, however, it is inverted by an external magnetic field around 400 Oe. No problem is caused in writing and erasing.

The inventors investigated a write-read characteristic of the magneto-optical recording disk in the present first embodiment. Writing was made by irradiating a laser beam of 530 nm wavelength and 7 mW power toward the substrate with the external magnetic field of 600 Oe, the disk rotation number of 3600 rpm, and recording frequency of 15 MHz. Observation was made on recording domains using a polarized microscope. The recording domain formed was 0.6 μm wide and 0.3 μm long. It was found that when it was read, it was enough to code data at an carrier-to-noise ratio C/N of 48 dB. The laser reading power was 1.5 mW. A laser power of 8.5 mW was needed to fully erase the data recorded in the above mentioned conditions.

The binary structure made as described above could successfully improve only the temperature characteristic and waveform characteristic of the magneto-optical characteristics (Kerr effect) while it provides the same magnetic (coersive force and saturated magnetization) temperature characteristics as conventional materials. Particularly in the alternately laminated layer of Pt and Co, the Curie temperature is estimated around 500°C. The perpendicular anisotropic energy at room temperature was $3 \times 10^4$ J/m$^3$, and the coersive force was 1.0 kOe. As it is lower than 10 Oe around 200°C, however, the magnetization can be easily inverted by an external magnetic field of 400 Oe in writing and erasing. In this case, as the external magnetic field is magnetically coupled with the layer, the perpendicular anisotropic energy is as high as $6 \times 10^5$ J/m$^3$, the same level as in the TbFeCoNb layer.

The present first embodiment used the alternately laminated layer of Pt and Co which is a material having a greater magneto-optical effect in regions of shorter wavelengths for the first magneto-optical recording layer 3-1. The effect was not obtained by the layer, but also by a layer of Pd or Rh in place of Pt and another layer of Fe or Ni in place of Co or by a FeCo and NiCo alloys. Similar results also were obtained by thin alloy layers of noble metal elements with iron group elements, including PtFe, PtCo, PdCo, RhCo, and PtNiCo. Similar results further were obtained by thin alloy layers, including NdFeCo, PrFeCo, SmFeCo, CeFeCo, TbNdFeCo. TbPrFeCo, TbSmFeCo, DyNdFeCo, and HoPrFeCo. Similar results further more were obtained by alternately laminated layers, including Nd and FeCo, Pr and FeCo, Sm and FeCo, and Ce and FeCo.

On the other hand, the first magneto-optical recording layer 3-1 could have an alternative layers of Pt, Co, and SiNx used in place of Pt and Co to improve the wavelength characteristic for the Kerr rotation angle. This could further increase the write output.

The second magneto-optical recording layer 3-2 could have an alloy of Ti, Ta, Cr, Pt, Pd, or Rh added in place of Nb of the above mentioned layer of $Tb_{24}Fe_{61}Co_{12}Nb_3$ to obtain similar results. It also could have an alloy of Dy, Gd, or Ho added in place of Tb of that to obtain similar results. It further could have an alloy of TbFeCo with no Nb added to obtain similar results in the magneto-optical effect and perpendicular anisotropy except corrosion resistance. This roughly applied to alloy layers of DyFeCo, GdFeCo, and HoFeCo and alternately laminated layers of Tb and FeCo, Dy and FeCo, Gd and FeCo, and Ho and FeCo. Similar results for the magneto-optical effect and perpendicular anisotropy were obtained by using laminated layers of Nd, Tb and FeCo, Nd, Dy and FeCo, Nd, Gd and FeCo, and Nd, Ho and FeCo. This applied to use of laminated layers of Ti, Ta, Cr, Pt, Pd, and Rh in place of Nb.

In order to strengthen a magnetic coupling of the first magneto-optical recording layer 3-1 and the second magneto-optical recording layer 3-2, the iron group element layer of the first magneto-optical recording layer 3-1 may be the top layer. To weaken it, conversely, the noble metal element layer may be the top layer. The control may be made through a layer, for example, a GdDyFeCo layer, which has an intermediate perpendicular anisotropic energy with the second magneto-optical recording layer 3-2.

The reflective layer structure causes thermal diffusion. This provides an effect that can suppress inter-diffusion of elements between two layers or layers of the alternately laminated layers of Pt and Co. Because there was no change of the magnetic characteristics, the write output was not changed even if write, read, and erase were repeated in conditions over $10^7$ times.

Embodiment 2

Figure 3:
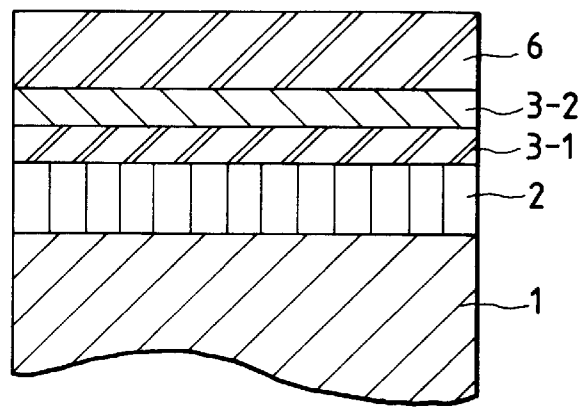
FIG. 3 is a schematic cross sectional representation of a second illustrative embodiment of the present invention for the magneto-optical recording medium (disk).

FIG. 3 is a schematic cross sectional representation of a second illustrative embodiment of the present invention for the magneto-optical recording medium (disk). The disk was formed in the procedures described below. A substrate 1 of glass plate having a plastic having guide grooves (not shown) thereon had a first inorganic compound layer 2 of silicon nitride formed by the sputtering technique. Preparation conditions used and layer thicknesses formed were the same as in the first embodiment.

In turn, a first magneto-optical recording layer 3-1 had an alternately laminated layer of Pt and FeCo formed. Targets used were Pt and $Fe_{60}Co_{40}$, respectively. A sputtering gas used was Ar. Sputtering conditions include a sputtering gas pressure of $5 \times 10^{-3}$ Torr, a substrate rotation of 120 rpm, and dc powers to Pt of 8.0 W/cm$^2$ and to FeCo of 4.2 W/cm$^2$. A layer thickness was 200 Angstrom.

In turn, a second magneto-optical recording layer 3-2 had a layer of $Tb_{24}Fe_{61}Co_{12}Nb_3$ formed to a thickness of 200 Angstrom by the sputtering technique. Sputtering conditions were the same as in the first embodiment.

Finally, a light reflective layer and magneto-optical recording layer 6 had an alternately laminated layer of Pt and Co by the sputtering technique. Sputtering conditions were the same as in the substrate 1 of the first embodiment. A layer thickness was 700 Angstrom.

Figure 4:
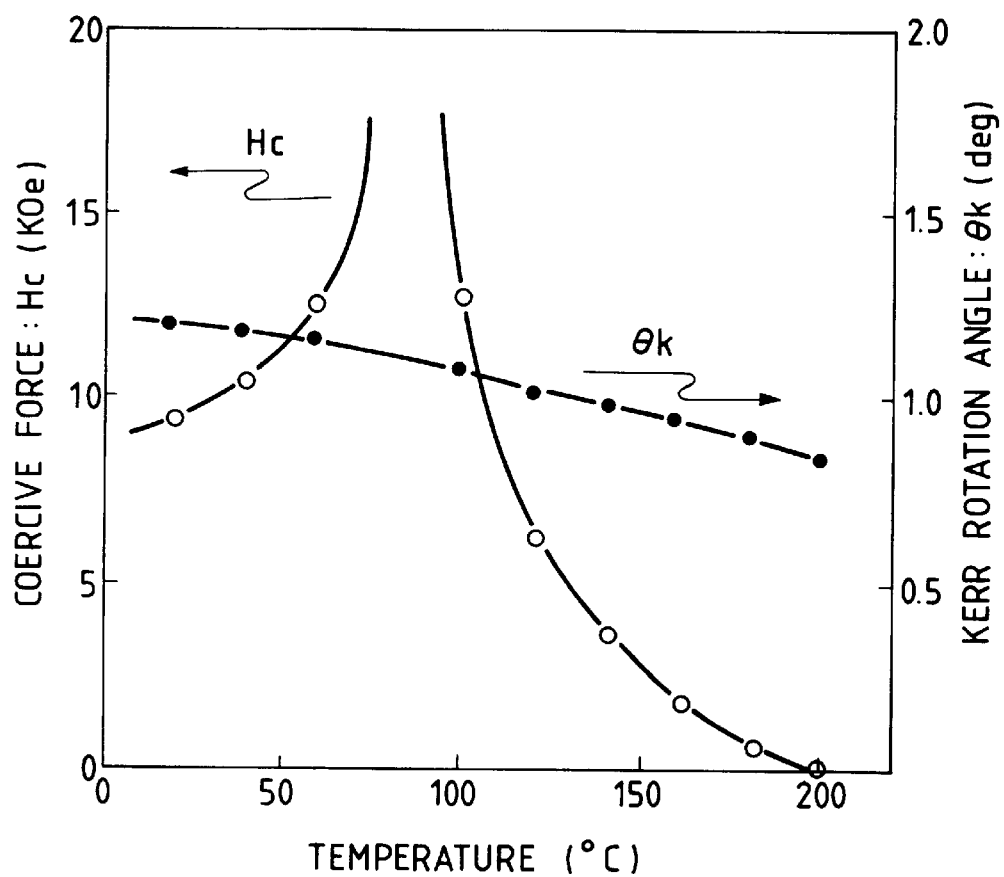
FIG. 4 shows a magnetic and magneto-optical temperature dependencies of the magneto-optical recording disk formed as described in the second embodiment.

FIG. 4 shows the magnetic and magneto-optical temperature dependencies of the magneto-optical recording disk formed as described in the second embodiment. The change of coersive force Hc with temperature was the same as that of the recording medium in the first embodiment. The change of Kerr rotation angle θk for the wave length λ of 470 μm with temperature, however, was 0.85° at 200°C, more gentle than that of the first embodiment. Note that the value is not a value in zero magnetic fields, but an externally interpolated value in saturated magnetic field. Although the Kerr effect is obtained, the write-erase characteristic depends on the magnetic temperature characteristic of the second magneto-optical recording layer 3-2 because the coersive force is as low as a few to several ten Oersteds around that temperature.

The inventors investigated a write-read characteristic of the magneto-optical recording disk in the second embodiment. Writing was made by irradiating a laser beam of 470 nm wavelength and 5 mW power toward the substrate with the external magnetic field of 400 Oe, the disk rotation frequency of 3600 rpm, and recording frequency of 15 MHz. When reading was made with a 1.5 mW reading laser power, coded data could be recorded as the carrier-to-noise ratio C/N was 49 dB. Observation was made on the recording domains using a polarized microscope. The recording domain formed was as minute as 0.5 pm wide and 0.25 μm long. No inter-pin interference could not been seen. The laser output needed to fully erase the recorded domains was 6 mW when a track offset of 0.2 μm was taken into account. The write output was not changed even if write, read, and erase were repeated more than $10^7$ times in those conditions.

The light reflective layer and magneto-optical recording layer 6 serves as protection layer as it provides a high corrosion resistance as well as the features of reflection and magneto-optical recording. In order to further increase that effect, a composition modulation can be made in a way that the noble metal layers such as Pt are made thick as they go toward the outside. If Pt, FeCo, and SiNx were repeated in place of the layer of Pt and FeCo on the laser beam irradiated side, the Kerr rotation angle could be further increased. In addition, the playback output could be increased.

Embodiment 3

Figure 5:
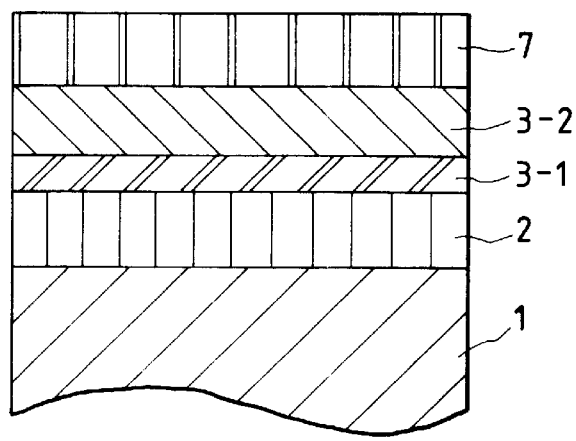
FIG. 5 is a schematic cross sectional representation of a third illustrative embodiment of the present invention for the magneto-optical recording medium (disk).

FIG. 5 is a schematic cross sectional representation of a third illustrative embodiment of the present invention for the magneto-optical recording medium (disk). The disk was formed in the procedures described below. A substrate 1 of glass plate having a plastic having guide grooves (not shown) thereon had a first inorganic compound layer 2 of silicon nitride formed by the sputtering technique. Preparation conditions used and layer thicknesses formed were the same as in the first embodiment.

In turn, a first magneto-optical recording layer 3-1 had a layer of $Nd_{25}Fe_{60}Co_5$ formed to a thickness of 200Angstrom. A second magneto-optical recording layer 3-2 had a $Tb_{23}Fe_{62}Co_{12}Nb_3$ formed to a thickness of 800Angstrom. It need scarcely be said that the first magneto-optical recording layer 3-1 and the second magneto-optical recording layer 3-2 were coupled together magnetically. Finally, a protection layer 7 was formed to a thickness of 2000 Angstrom by the sputtering technique. Conditions for this were that Si was used for target, a mixed gas of ar and $N_2$ of pressure ratio of 90 to 10 was used for sputtering gas, an rf power density was 6.3 W/cm², and a sputtering gas pressure was $1 \times 10^{-2}$ Torr.

Figure 6:
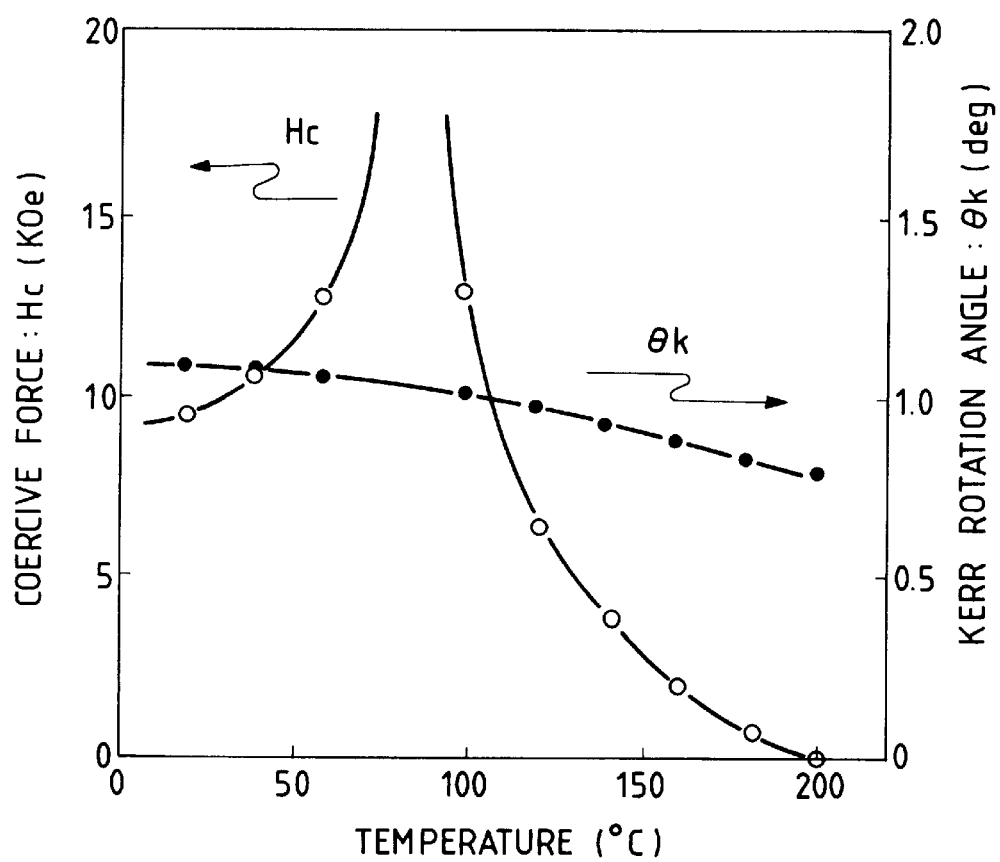
FIG. 6 shows a magnetic and magneto-optical temperature dependencies of the magneto-optical recording disk formed as described in the third embodiment.

FIG. 6 shows the magnetic and magneto-optical temperature dependencies of the magneto-optical recording disk formed as described in the third embodiment. The change of coersive force with temperature, as shown in the figure, depends roughly on the change of the second magneto-optical recording layer 3-2 with temperature. The change of Kerr rotation angle with temperature depends roughly on the change of the first magneto-optical recording layer 3-1 with temperature. The magnetic coupling is cut out between 180 and 200°C by a thermal vibration. Beyond the temperature, it depends on the magnetic and magneto-optical temperature dependencies of only the NdFeCo layer, which cannot be shown in the range of the figure. This is the same as in the preceding two embodiments. The change of Kerr rotation angle with temperature was measured at wavelength λ of 470 nm.

As described above, the magnetic coupling of two or more magnetic layers of different magnetic characteristics allows combination of only advantageous magnetic characteristics of the layers. As an example, a single layer of TbFeCoNb shows that the Kerr rotation angle at around 100°C of the magneto-optical recording layer temperature in reading is 25% of the one at room temperature. In the third embodiment, however, the reduction of the Kerr rotation angle at around 100°C is as little as less than 10% because the Kerr rotation angle of the TbFeCo layer cannot vanish until the temperature reaches as high as over 500°C. This means that a greater read output can be obtained. Further, a greater Kerr rotation angle can be obtained because multiple enhancement is used within the NdFeCo layer.

The inventors investigated a write-read characteristic of the magneto-optical recording disk in the third embodiment. Writing was made by irradiating a laser beam of 7 mW power toward the substrate with the external magnetic field 400 Oe, the disk rotation number of 3600 rpm, and recording frequency of 15 MHz. It was found that when reading is made, coded data could be recorded as the carrier-to-noise ratio C/N was 47 dB at an innermost position of 30 mm radius. No change of read output was found when a cycle of write, read, and erase was repeated over $10^6$ times with an erase laser power of 9 mW and the above mentioned recording laser power in which a track offset of 0.2 μm was taken into account.

The third embodiment used the NdFeCo group for the first magneto-optical recording layer 3-1. This could be replaced by an alternately laminated layer of NdFeCo and SiNx of a few to several tens Angstrom thick each. This could improve the dependency of Kerr rotation angle θk on wavelength to make it greater. Such an effect could be obtained by replacing NdFeCo by Pt and Co, Pd and Co, and Rh and Co, and by replacing Co by alternately laminated layers of CoFe alloys, including Pt and CoFe, Pd and CoFe, and Rh and CoFe. The effect also could be obtained with use of alternate layers of Pt, Co, and SiNx, which has an optically transparent layer inserted therein. The alternate layers could include alternately laminated layers of noble metal elements and iron group elements.

Embodiment 4

Figure 7:
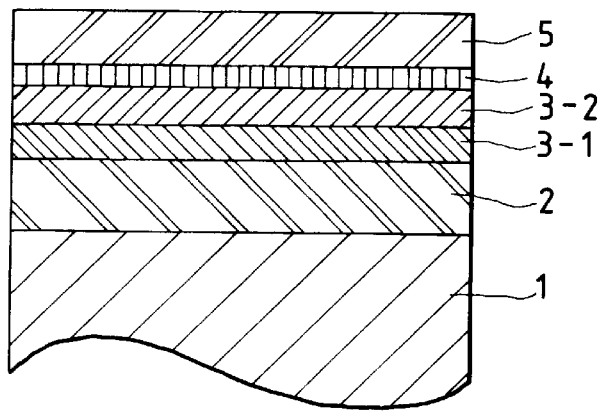
FIG. 7 is a schematic cross sectional representation of a fourth illustrative embodiment of the present invention for the magneto-optical recording medium (disk).

FIG. 7 is a schematic cross sectional representation of a fourth illustrative embodiment of the present invention for the magneto-optical recording medium (disk). The disk was formed in the procedures described below. A substrate 1 having guide grooves (not shown) thereon had a first inorganic compound layer 2 of silicon nitride formed to 550 Angstrom thick by the sputtering technique. Sputtering conditions were that a sputtering gas of Ar and $N_2$ of ratio of 90 to 10 was sputtered to target of Si, a sputtering gas pressure was $1 \times 10^{-2}$ Torr, and an rf power was 300/3" dia. In turn, a first magneto-optical recording layer 3-1 was formed by the binary sputtering technique. Targets used were Pt and Co. Power densities were 300 W/3" dia for Pt and 150 W/3" dia for Co. During sputtering, the substrate was revolved at 50rpm. The resultant layer thicknesses of Pt and Co were 20 and 5 Angstrom, respectively. The whole magneto-optical recording layer was controlled to 150Angstrom thick.

Figure 8:
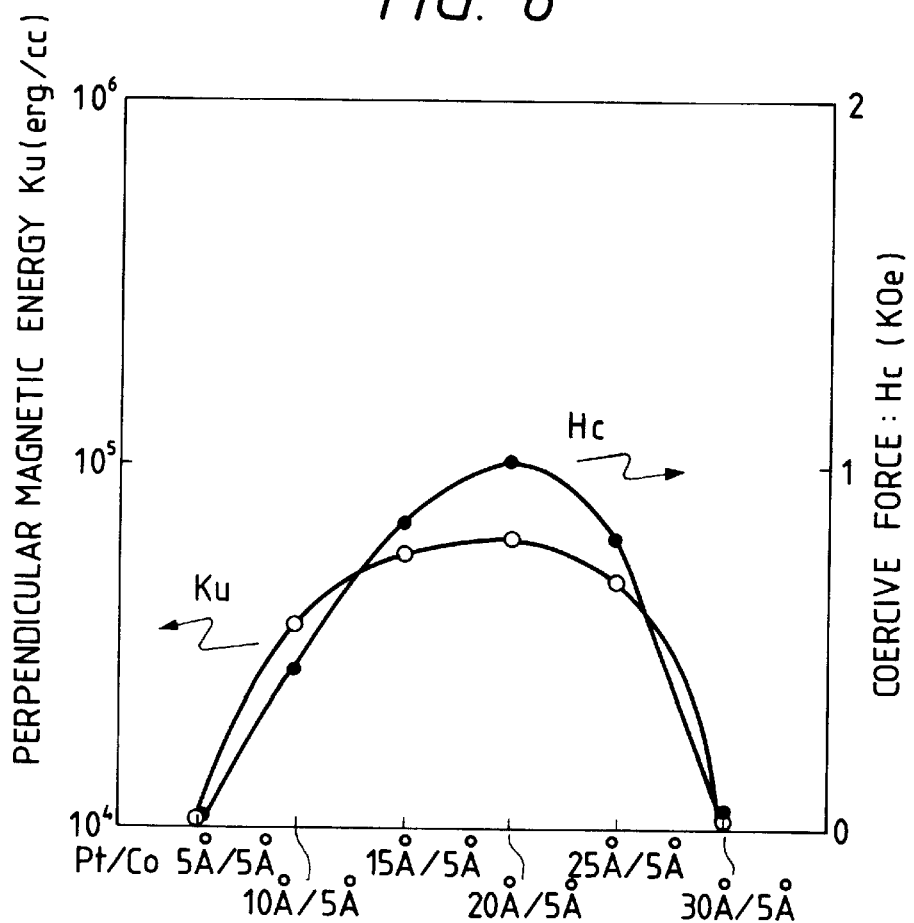
FIG. 8 shows dependencies of coersive force and perpendicular magnetic energy on thickness ratio of the alternately laminated multi-layer structure of Pt and Co which were 10 to 5 Angstrom, 15 to 5 Angstrom, 20 to 5 Angstrom, and 25 to 5 Angstrom for the whole layer thickness of 150 Angstrom.

FIG. 8 shows dependencies of coersive force and perpendicular magnetic energy on thickness ratio of the alternately laminated multi-layer structure of Pt and Co which were 10 to 5 Angstrom, 15 to 5 Angstrom, 20 to 5 Angstrom, and 25 to 5 Angstrom for the whole layer thickness of 150 Angstrom. As seen in the figure, both the coersive force and perpendicular energy were maximum at the Pt/Co ratio of 20 to 5 Angstrom. The perpendicular anisotropy appeared between 10 to 5Angstrom to 25 to 5 Angstrom. At the ratios of 5 to 5Angstrom and 30 to 5 Angstrom, the perpendicular anisotropy was too little to increase the apparent perpendicular magnetic energy of the whole layer even with use of exchange bond force.

In turn, a second magneto-optical recording layer 3-2 was formed of $Tb_{25.5}Fe_{56.5}Co_{15}Nb_3$ to a thickness of 150Angstrom by the sputtering technique. As sputtering conditions, Ar was used as sputtering gas, and TbFeCoNb alloy was as target. A sputtering gas pressure was $5 \times 10^{-2}$ Torr, and an rf power was 200W/3" dia. Magnetic characteristics of the first magneto-optical recording layer 3-1 and the second magneto-optical recording layer 3-2 are tabulated below.

|  | First magneto-optical recording layer 3-1 | Second magneto-optical recording layer 3-2 |
| --- | --- | --- |
| Saturated magnetization | 300 emu/cc | 150 emu/cc |
| Coersive force | 1 KOe | 10 KOe |
| Perpendicular magnetic energy | $7 \times 10^4$ erg/cc | $8 \times 10^5$ erg/cc |

For the whole magneto-optical recording layer, the Curie temperature Tc was 250°C, the compensation temperature Tcomp was 80°C, the coersive force Hc was 14 kOe, and the Kerr rotation angle θk was 0.60°, with the wavelength λ being 530 nm for the recording layer only.

In turn, a second inorganic compound layer 4 was formed of silicon nitride to a thickness of 200 Angstrom. Preparation conditions are the same as the ones for the first inorganic compound layer 2.

Finally, a light reflective layer 5 was formed of $Al_{85}Ti_{15}$ to 500 Angstrom thick by the sputtering technique. As sputtering conditions, Ar was used as sputtering gas, and a composite target was formed of 12Ti chips of 4 mm × 4 mm × 1 mm thick uniformly arranged on Al disk. A sputtering gas pressure was $1 \times 10^{-2}$ Torr, and an rf power was 150 W/3" dia.

Figure 9:
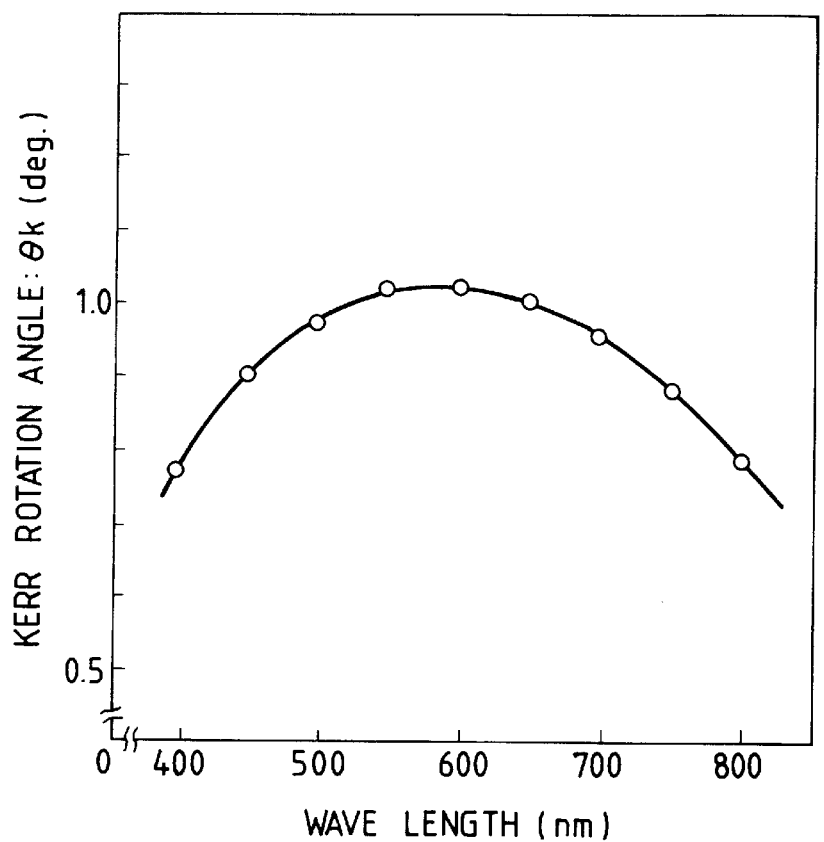
FIG. 9 Shows a wavelength characteristic of the Kerr rotation angle of the magneto-optical recording disk formed as described in the fourth embodiment.

FIG. 9 shows a wavelength characteristic of the Kerr rotation angle of the magneto-optical recording disk formed as described in the fourth embodiment. The figure shows that there exists one peak of the Kerr rotation angle between 500 and 600 nm. The reflective index was as high as 18%. Writing was made on the disk using a laser beam of 530 nm wavelength in conditions that the disk position is at 30 mm dia, the recording laser power 7 mW, the disk rotation speed was 2400 rpm, the pulse width was 50 nsec, and the recording frequency 8 MHz. Observation was made on recording domains using a polarized microscope. The recording domain formed was as good as around 0.45 μm dia. The carrier-to-noise ratio C/N obtained was 49 dB, enough to recorded code data.

Such an effect could be obtained by replacing Pt of the first magneto-optical recording layer 3-1 by Pd or Rh. Fe could be replaced by Co or Mn. The layer thickness ratio of Pt to Co in the fourth embodiment was 20 to 5 Angstrom. This could be replaced by 15 to 5 Angstrom, 12 to 5 Angstrom, or 10 to 5 Angstrom. The coersive force of the layer alone was 1 kOe in the ratio of 20 to 5 Angstrom, maximum of all. The exchange bond force with the second magneto-optical recording layer 3-2 also was maximum. This is due to fact that the exchange bond force of the first magneto-optical recording layer 3-1 with the second magneto-optical recording layer 3-2 can be changed as the saturated magnetization of 300 emu/cc can be controlled to 400, 500, or 650 emu/cc with change of the layer thickness ratio.

In place of Tb used for the second magneto-optical recording layer 3-2, there could be used Dy or Ho to provide the magnetic characteristics similar to those of Tb.

In place of the change of layer thickness ratio, the saturated magnetization in the first magneto-optical recording layer 3-1 can be controlled by adding into Co a non-magnetic metal element Nb, Ti, Ta, Cr, W, or Mo and changing its concentration.

In such a structure, the Kerr rotation angle could be increased to a great extent by the Kerr enhancement effect in the first inorganic compound layer 2 and the second inorganic compound layer 4 and by both the Kerr effect and Faraday effect as well as the Kerr enhancement effect in the first magneto-optical recording layer 3-1 and the second magneto-optical recording layer 3-2. It should be noted that the first magneto-optical recording layer 3-1 and the second magneto-optical recording layer 3-2 could be placed in any order, or at least it may place the one which provides greater magneto-optical effect to the laser beam of short wavelengths on the read and write side.

Embodiment 5

Figure 10:
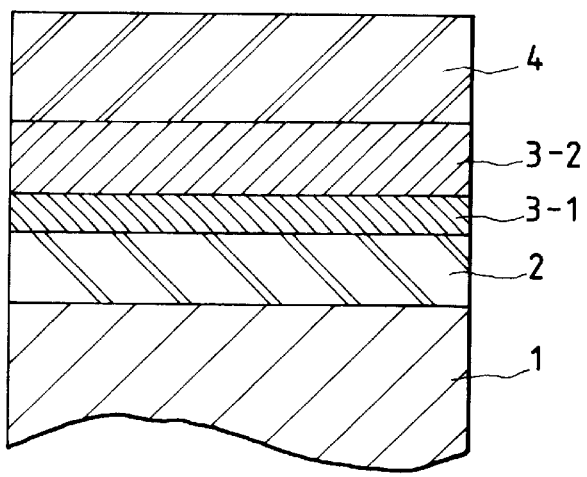
FIG. 10 is a schematic cross sectional representation of a fifth illustrative embodiment of the present invention for the magneto-optical recording medium (disk).

FIG. 10 is a schematic cross sectional representation of a fifth illustrative embodiment of the present invention for the magneto-optical recording medium (disk). The disk was formed by the procedures described below. A substrate 1 having guide grooves (not shown) thereon had a first inorganic compound layer 2 of silicon nitride formed to a thickness of 550 Angstrom by the sputtering technique. Preparation conditions used were the same as in the first embodiment.

In turn, a first magneto-optical recording layer 3-1 had an alternately laminated multi-layer structure of Pt and Co formed to a thickness of 250 Angstrom. The layer thickness ratio of Pt to Co and preparation conditions were all the same as in the first embodiment. In turn, a second magneto-optical recording layer 3-2 had a $Tb_{24.5}Fe_{60.5}Co_{12}Nb_3$ formed to a thickness of 750 Angstrom. Magnetic characteristics of the second magneto-optical recording layer 3-2 included Curie temperature Tc of 200°C, compensation temperature Tcomp of 80°C, coersive force Hc of 14 kOe, and Kerr rotation angle θk of 0.56°. Finally, a second inorganic compound layer 4 was formed of silicon nitride to a thickness of 2000Angstrom. Preparation conditions for this were same as in the fourth embodiment.

Figure 11:
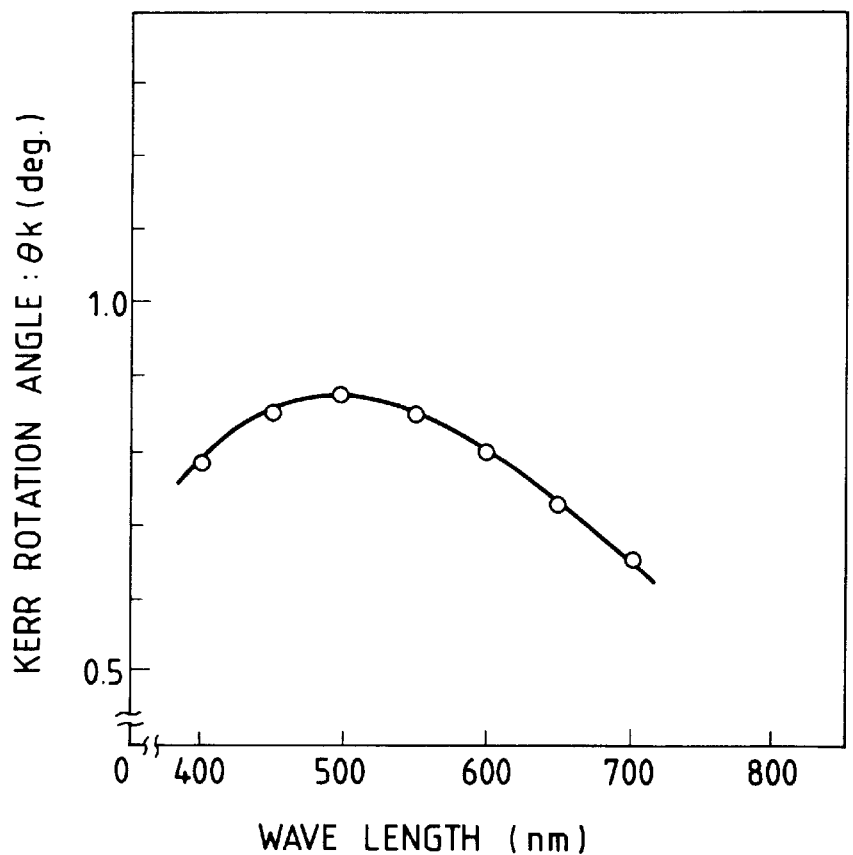
FIG. 11 shows a wavelength characteristic of the Kerr rotation angle of the magneto-optical recording disk formed as described in the fifth embodiment.

FIG. 11 shows a wavelength characteristic of the Kerr rotation angle of the magneto-optical recording disk formed as described in the fifth embodiment. The figure shows that there exists a peak of the Kerr rotation angle between 450 and 5500 nm. The value of θk was 0.87°. The reflective index R was 15%. Writing was made on the disk using a laser beam of 480 nm wavelength in under conditions that the disk position is at 30 mm dia, the recording laser power 8 mW, the disk rotational number was 2400 rpm, the pulse width was 50 nsec, and the recording frequency 8 MHz.

Observation was made on recording domains using a polarized microscope. The recording domain formed was around 0.45 µm dia. The carrier-to-noise ratio C/N obtained was 48 dB, enough to recorded code data.

In the fifth embodiment was observed an increased magneto-optical effect with a multiple enhancement in the first magneto-optical recording layer 3-1, as well as in the Kerr rotation and the Faraday rotation. The Kerr enhancement effect in the second magneto-optical recording layer 3-2 was added to them so that a greater Kerr rotation angle could be obtained.

Such an effect could be obtained by replacing Pt of the first magneto-optical recording layer 3-1 by Pd or Rh. Co could be replaced by Fe or Mn for a similar effect. Co and Fe could have Nb, Ti, Ta, Cr, W, or Mo added thereto to control the magnetic characteristics, particularly the saturated magnetization. They further could have Pd, Pt, or Rh added thereto to achieve this control. The thickness ratio of platinum group element and iron group element layers in the fifth embodiment was 20 to 5 Angstrom. This could be replaced by 15 to 5 Angstrom, 12 to 5 Angstrom, or 10 to 5 Angstrom.

In such ways that the iron group element layer was added with the element and that the layer thickness ratio was changed, the saturated magnetization could be changed to control the exchange bond force.

In place of Tb used for the second magneto-optical recording layer 3-2, there could be used Dy or Ho to provide magnetic characteristics similar to those of Tb.

The addition of Ta into the second magneto-optical recording layer 3-2 was to improve corrosion resistance of the layer. Ta could be replaced by Cr, Nb, or Ti for a similar effect.

Embodiment 6

Figure 13:
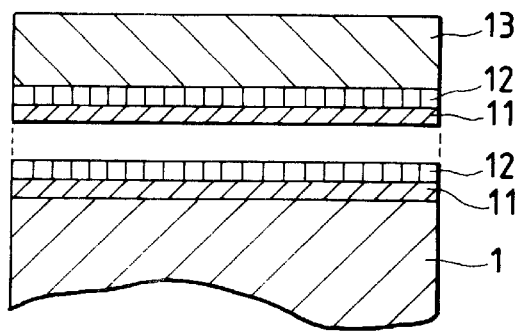
FIG. 13 is a schematic cross sectional representation of a sixth illustrative embodiment of the present invention for the magneto-optical recording medium (disk).

FIG. 13 is a schematic cross sectional representation of a sixth illustrative embodiment of the present invention for the magneto-optical recording medium (disk). The disk was formed by the procedures described below. A substrate 1 of glass or plastic plate had a multiple of couples of iron group layer 11 of Co and noble metal layer 12 of Pt alternately laminated to a multiple structure of 150 Angstrom thick. A Pt and Co targets were used to form the multi-layer structure by a binary simultaneous sputtering technique. Sputtering conditions included a sputtering gas was Ar. Its pressure of 5 mTorr, and rf powers were 4.2 W/cm$^2$ for Co and 3.6 W/cm$^2$ for Pt. The layer thickness of Pt was 12 Angstrom, and that of Co was 5 Angstrom. It should be noted that either first couple of layers of Pt and Co or of Co and Pt resulted in no difference in magnetic and magneto-optical characteristics of the multi-layer structure.

In turn, a rare earth-transition metal layer 13 was formed of $Tb_{235}Fe_{615}Co_{12}Nb_3$ formed to a thickness of 900Angstrom on the multi-layer structure by the sputtering technique. Sputtering conditions included a TbFeCo alloy target, a sputtering gas of Ar, its pressure of 5 mTorr, and an rf power of 4.4 W/cm$^2$.

Figure 14:
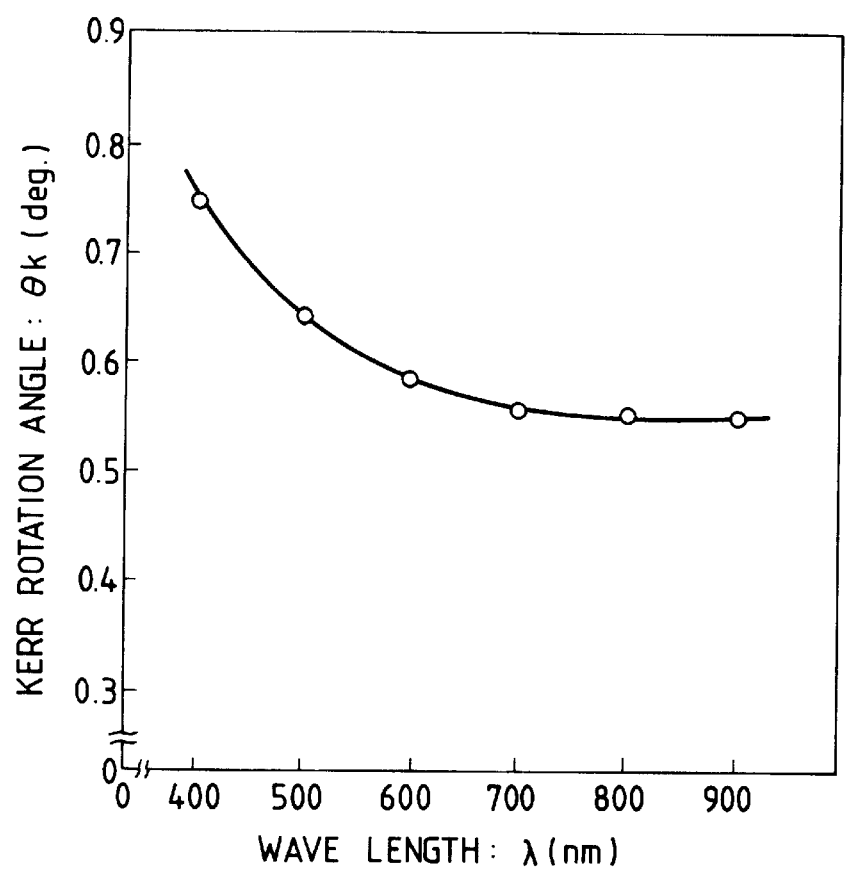
FIG. 14 shows a wavelength characteristic of the Kerr rotation angle of the magneto-optical recording disk formed as described above in the sixth embodiment.

FIG. 14 is a wavelength characteristic of the Kerr rotation angle of the magneto-optical recording disk formed as described above in the sixth embodiment. The figure shows that the Kerr rotation angle θk is virtually constant at 0.55° in a wavelength range of 900 to 700 nm. It is increased with decrease of the wavelength from 700 nm, being 0.75° at 400 nm. The coersive force was constant at 10 kOe, not depending on the wavelength. The perpendicular magnetic energy was $1 \times 10^5$ erg/cm$^3$ for the alternately laminated layer of Pt and Co, and $1 \times 10^6$ erg/cm$^3$ for the TbFeCoNb layer.

Figures 15, 16A, 16B:
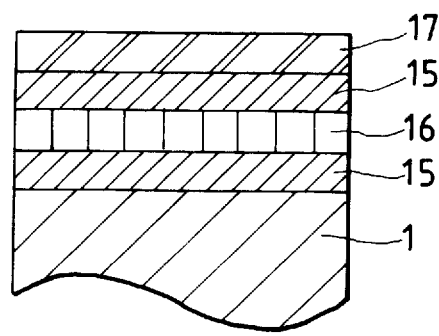
FIG. 15 is a schematic cross sectional representation of a sixth illustrative embodiment of the present invention for the magneto-optical recording disk.
FIG. 16(a) shows shapes of the recorded domains. It is seen in the figure that there are no pit interference in the sixth embodiment according to the present invention.

In turn, a magneto-optical recording disk was fabricated with use of the recording multi-layer structure described above. FIG. 15 is a schematic cross sectional representation of a sixth illustrative embodiment of the present invention for the magneto-optical recording disk. The disk was formed by the procedures described below. A substrate 1 of plastic or glass plate having guide grooves (not shown) thereon had a inorganic compound layer 15 of silicon nitride formed to a thickness of 850 Angstrom by the sputtering technique. Sputtering conditions used included a target of Si, a sputtering standard mixed gas of Ar and $N_2$ of ratio of 90 to 10, a sputtering gas pressure of $1 \times 10^{-2}$ Torr, and an rf power of 6.6 W/cm$^2$.

In turn, a magneto-optical recording layer 16 was formed to have the characteristic shown in FIG. 2. The thickness of the magneto-optical recording layer 16 was made the same as that of the alternately laminated layer of Pt and Co, and the thickness of TbFeCoNb was 200Angstrom. On this was formed the inorganic compound layer 15 of silicon nitride again to a thickness of 100 Angstrom.

Sputtering conditions for this were made the same as above. Finally, a metal layer 17 was formed of $Al_{85}Ti_{15}$ alloy to a thickness of 500 Angstrom by a sputtering technique. Sputtering conditions used included a target of AlTi alloy, a sputtering gas of Ar, a sputtering gas pressure of $1 \times 10^{-2}$ Torr, and an rf power of 3.3 W/cm$^2$. The recording medium prepared as such was coated with an ultraviolet hardened resin (UV resin) on a surface thereof to protect the disk to complete.

Figure 12:
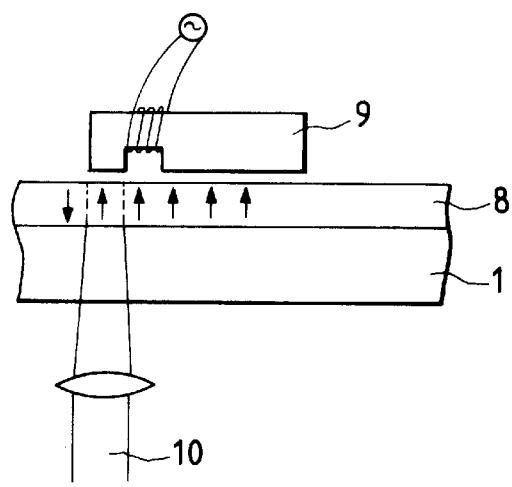
FIG. 12 is a schematic cross sectional representation of the completed disk.

FIG. 12 is a schematic cross sectional representation of the completed disk. A laser beam 10, as shown in the figure, is irradiated through the substrate 1 to the magneto-optical recording medium 8. A floating magnetic head 9 was used to switch an applied magnetic field direction to record. Wavelength of the laser beam 10 used was 530 nm.

FIG. 16(a) shows shapes of the recorded domains. It is seen in the figure that there is no pit interference in the sixth embodiment according to the present invention. The recording domain size was as small as 0.3 µm. FIG. 16 (b) is an example of the pit interference. This is due to the fact that the pits are overlapped with one another, not to be separated depending on the switching magnetic field condition and the disk structure, causing error.

The inventors wrote a high density pattern at the innermost position of 30 mm radius and read it with laser power of 1.0 mW. The resulted carrier-to-noise ratio C/N was 51 dB. It need hardly be said that over-write can be made as the magnetic field modulation recording method is used.

The effects described so far are not limited to the exchange bond layer of the alternately laminated layer of Pt and Co with TbFeCoNb. They also can be obtained by using Rh, Pd, or Au in place of Pt.

Also, Fe can be used in place of Co. It was found that the perpendicular anisotropy was further increased with use of an alternately laminated layer of any of alloys, including PtCo, PtFe, PdFe, PdCo, RhCo, RhFe, AuCo, and AuFe, with any of Rh, Pd, Au, and Pt.

Further, Tb of the TbFeCoNb alloy can be replaced by Gd, Dy, or Ho. In addition, alloys, such as GdTb, GdDy, GdHo, TbDy, TbHo, and DyHo, can be used for the rare earth element. In particular, with use of Gd alone or an alloy of a rare earth-transition metal containing Gd, the Kerr rotation angle was increased by 0.05 to 0.1°. Replacement of Nb by Ti, Ta, or Cr resulted in no difference. Addition effects of those elements include increase of heat resistance due to suppression of structural easing in the magneto-optical recording layer as well as increase of corrosion resistance of the recording layer.

The base metal Al of the Al Ti alloy used for the metal layer 17 can be replaced by Au, Pt, Pd, Rh, Cu, Ag, Cr, Pb, or Cu, resulting in no difference. It is matter of course that the alloy can be replaced by any of the metal elements, from which a desired one may be selected depending on sensitivity of the disk.

In place of Ti which was added to increase the corrosion resistance and the thermal conductivity to make effective the recording sensitivity and the recording domain shape control, Ta, Cr, Nb, Ti, W, or Mo could be added to the starting composition, resulting in a similar effect. As an example, Al—Cu could be used to increase the thermal conductivity control and the layer corrosion resistance without decrease of the reflection factor.

For the purpose of illustration only, the floating magnetic head 9 was used in the present sixth embodiment. It will be understood that the present invention is not limited to it, but extends to any means that can generate the switching magnetic field. If a short wave light source is used, the read output is expected to increase.

Embodiment 7

Figure 17:
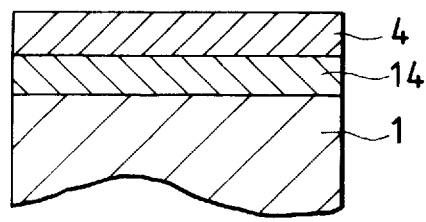
FIG. 17 is a schematic cross sectional representation of a seventh illustrative embodiment of the present invention for the magneto-optical recording disk.

FIG. 17 is a schematic cross sectional representation of a seventh illustrative embodiment of the present invention for the magneto-optical recording disk. The disk was formed in the procedures described below. A substrate 1 of plastic or glass plate had a light rare earth-transition metal layer 14 of $Nd_{25}Fe_{42}Co_{30}Nb_3$ formed to a thickness of 150 Angstrom by the sputtering technique. Sputtering conditions used included a target of NdFeCo alloy, a sputtering gas of Ar, a sputtering gas pressure of $5 \times 10^{-3}$ Torr, and an rf power of 4.2 W/cm$^2$. Further, a layer of $Tb_{23.5}Fe_{61.5}Co_{12}Ta_3$ was formed to a thickness of 850 Angstrom by the sputtering technique. Sputtering conditions used are same as the sixth embodiment except for a target of TbFeCoTa alloy.

Figure 18:
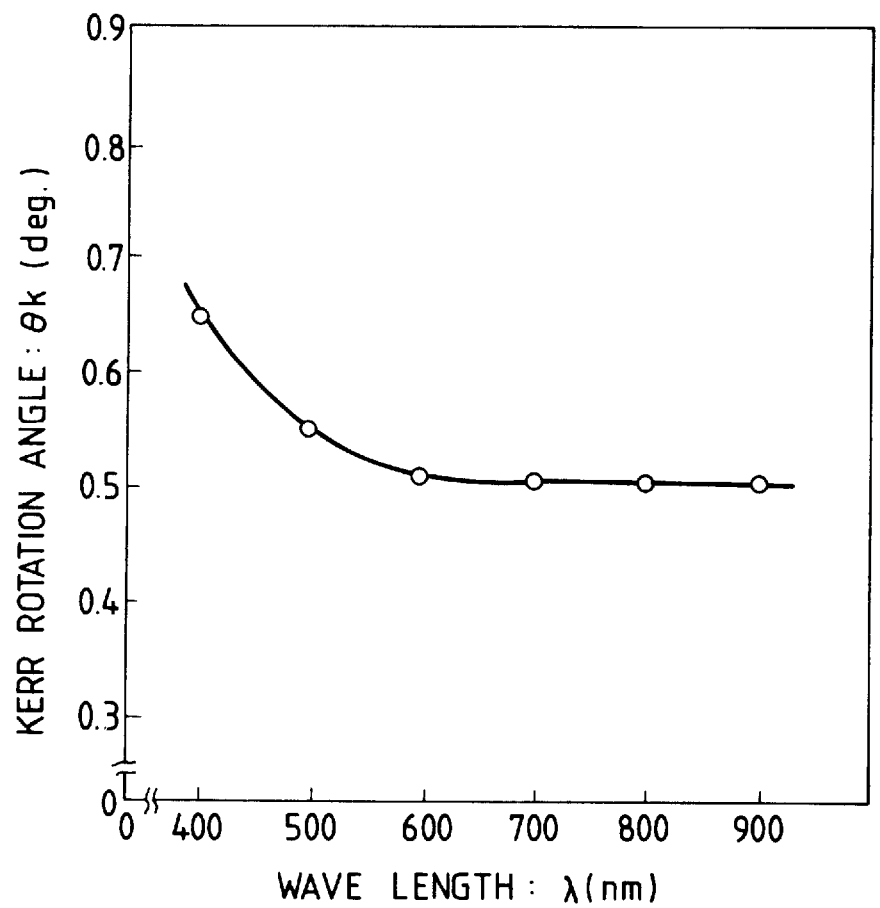
FIG. 18 shows a wavelength characteristic of the Kerr rotation angle of the magneto-optical recording disk formed as described above in the present seventh embodiment.

FIG. 18 shows a wavelength characteristic of the Kerr rotation angle of the magneto-optical recording disk formed as described above in the present seventh embodiment. The figure shows that the Kerr rotation angle θk is virtually constant at 0.5° in a wavelength range of 900 to 600 nm. It is increased with decrease of the wavelength from 600 nm, being 0.65° at 400 nm. The perpendicular magnetic energy was distributed in the layer thickness direction as it was $1 \times 10^4$ erg/cm$^3$ for the NdFeCoNb layer and $1 \times 10^6$ erg/cm$^3$ for the TbFeCoTa layer.

In turn, a magneto-optical recording disk was fabricated with use of the recording layer described above. Its schematic cross sectional representation is like the sixth illustrative embodiment of the present invention as shown in FIG. 15. A substrate 1 of plastic or glass plate having guide grooves (not shown) thereon had a inorganic compound layer 15 of silicon nitride formed under the same conditions as in the sixth embodiment. Then, a magneto-optical recording layer 16 was formed by the sputtering technique. The NdFeCoNb layer of 100 Angstrom thickness, the TbFeCoTa layer of 200 Angstrom thickness, and other preparation method and conditions were used as in the sixth embodiment. The other inorganic compound layer 15 was formed of silicon nitride to a thickness of 150 angstrom in the same conditions as in the preceding layer again. A metal layer 17 was formed of $Al_{90}Ta_{10}$ to 400 angstrom. Sputtering conditions were same as in the first embodiment except that the AlTa alloy was used for the target. After this, it was coated with an ultraviolet hardened resin (UV resin) on a surface thereof to protect the disk to complete.

The magneto-optical recording medium 8 had the laser beam 10 continuously irradiated through the substrate 1 by the magnetic field modulation recording method shown in FIG. 12. A high speed switching magnetic field was applied to the magneto-optical recording medium 8 by the floating magnetic head 9 to write at a frequency of 15 MHz.

Shapes of the recorded domains are shown in FIG. 16(a). It is seen in the figure that there are no pit interference in the seventh embodiment. Wavelength of the laser beam 10 used was 530 nm so that a high resolution could be attained. The C/N was 50 dB. It need hardly be said that over-write can be made as the magnetic field modulation recording method is used.

Such advantages also were attained by a light rare earth element, such as Pr or Sm, in place of Nb used in the light rare earth-transition metal layer 14. The rare earth element Tb used in the rare earth-transition metal layer 13 could be replaced by Dy, Ho, or Gd. In addition, alloys, such as GdTb, GdDy, GdHo, TbDy, TbHo, and DyHo, can be used for the rare earth element. In particular, with use of Gd alone or an alloy of a rare earth-transition metal containing Gd, the Kerr rotation angle was increased by 0.05 to 0.10°. Nb and Ta added to the layer containing the rare earth element were effective to increase the corrosion resistance and the thermal resistance so that reliability of the disk could be increased. Similarly, Ti and Cr were effective in those. The base metal Al of the AlTi alloy used for the metal layer 17 can be replaced by Au, Pt, Pd, Rh, Cu, Ag, Cr, Pb, or Cu, resulting in no difference. In place of Ta which was added to increase the corrosion resistance and the thermal conductivity to make effective the recording sensitivity and the recording domain shape control, Ti, Cr, Nb, W, or Mo could be added to the starting composition, resulting in similar effect.

Embodiment 8

Figure 19:
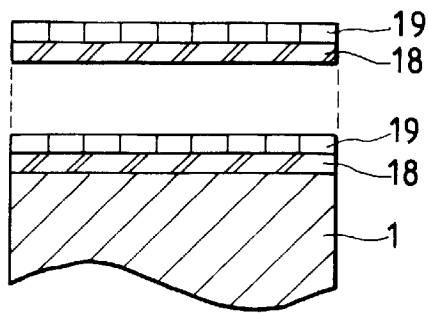
FIG. 19 is a schematic cross sectional representation of a eighth illustrative embodiment of the present invention for the magneto-optical recording medium (disk).

FIG. 19 is a schematic cross sectional representation of an eighth illustrative embodiment of the present invention for the magneto-optical recording medium (disk). The disk was formed in the procedures described below. A substrate 1 of glass or plastic plate had a multiple of couples of transition metal layer 18 of $Co_{95}Nb_5$ and noble metal layer 19 of Pt alternately laminated to a multiple structure of 150 Angstrom thick by the sputtering technique. A binary simultaneous sputtering technique was used to form a composite target having Nb chips uniformly arranged on a Co disk and a Pt disk. Sputtering conditions included a sputtering gas, its pressure of $5 \times 10^{-3}$ Torr, and rf powers of 4.2 W/cm$^2$ for CoNb and 6.6 W/cm$^2$ for Pt, and a substrate rotational number of 120 rpm. The layer thickness of CoNb was 5 Angstrom, and that of Pt was 12 Angstrom.

The perpendicular magnetic energy of the magneto-optical recording layer prepared as described above was $7 \times 10^5$ erg/cm$^2$. This was greatly increased as compared with $9 \times 10^4$ erg/cm$^2$ which is that of the alternately laminated multi-layer structure of Co and Pt containing no Nb. It is found that it can exist stably as the perpendicularly magnetized layer. The saturated magnetization Ms was 170 emu/cc, which was quite less than 700 emu/cc of the layer containing no Nb. The coersive force Hc was 6 kOe, which was increased far higher than 1 kOe of the one having no Nb contained. This could store the written data stably.

Figure 20:
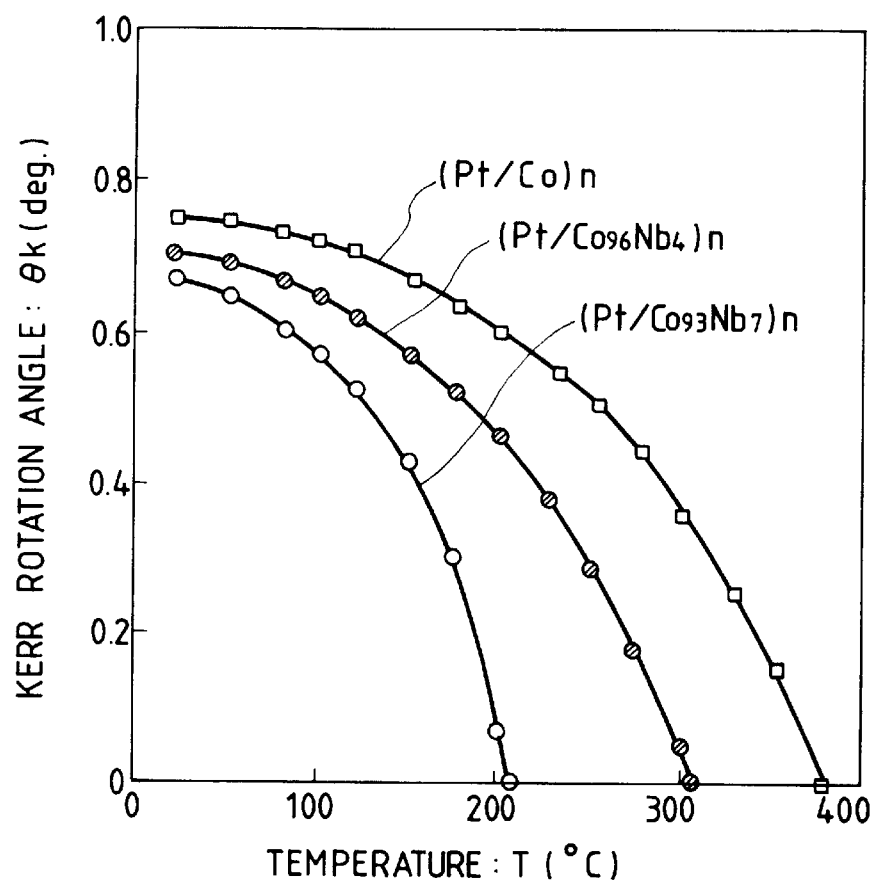
FIG. 20 shows temperature dependencies of the Kerr rotation angle.

FIG. 20 is temperature dependencies of the Kerr rotation angle. In the alternately laminated multi-layer structure of (Pt/Co$_{100}$-xNbx)n, if the concentration X of Nb is increased from 0 to 4 to 7at%, the Curie temperature was decreased from 380 to 305 to 205°C. This means that with the Nb concentration controlled, the Curie temperature can be selected as desired. If Nb was added more than 20 at%, however, magnetism disappeared conversely, and the perpendicular anisotropy vanished.

This effect was not limited to Nb, but applied to addition of Pt, Pd, Rh, Au, Ti, Cr, Ta, W, and Mo. For W and Mo, the magnetism disappeared with addition of 10at%. For the other elements, their addition caused disappearance of the magnetism at around 20 at% as in the above.

If Pt, Pd, Rh, or Au was added, the reflection factor was increased. This made a performance index ($\sqrt{R}$, θk) of the disk increase so that stable read signal could be obtained. Since the addition of an element could control the magnetic characteristics easily as such, a desired disk characteristic could be obtained.

Embodiment 9

Figure 21:
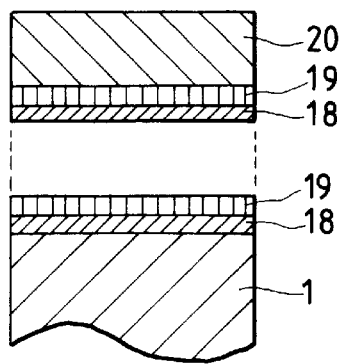
FIG. 21 is a schematic cross sectional representation of a ninth illustrative embodiment of the present invention for the magneto-optical recording medium (disk).

FIG. 21 is a schematic cross sectional representation of a ninth illustrative embodiment of the present invention for the magneto-optical recording medium (disk). The disk was formed in the procedures described below. A substrate 1 of glass or plastic plate had a multiple of couples of transition metal layer 18 of $Co_{90}Ti_{10}$ and noble metal layer 19 of Pt alternately laminated to a multiple structure of 130 Angstrom thick in all in the same sputtering technique as in the eighth embodiment. The layer thickness of Pt was 10 Angstrom, and that of CoTi was 5 Angstrom. Further a rare earth-iron group alloy layer 20 of $Tb_{25}Fe_{62}Co_{10}Nb_3$ was formed on the couples of layers to 870 Angstrom thick by the sputtering technique. Sputtering conditions included a TbFeCoNb alloy for the target, a sputtering gas of Ar, its pressure of $5 \times 10^{-3}$ Torr, and rf powers of 4.2 W/cm².

Figure 22:
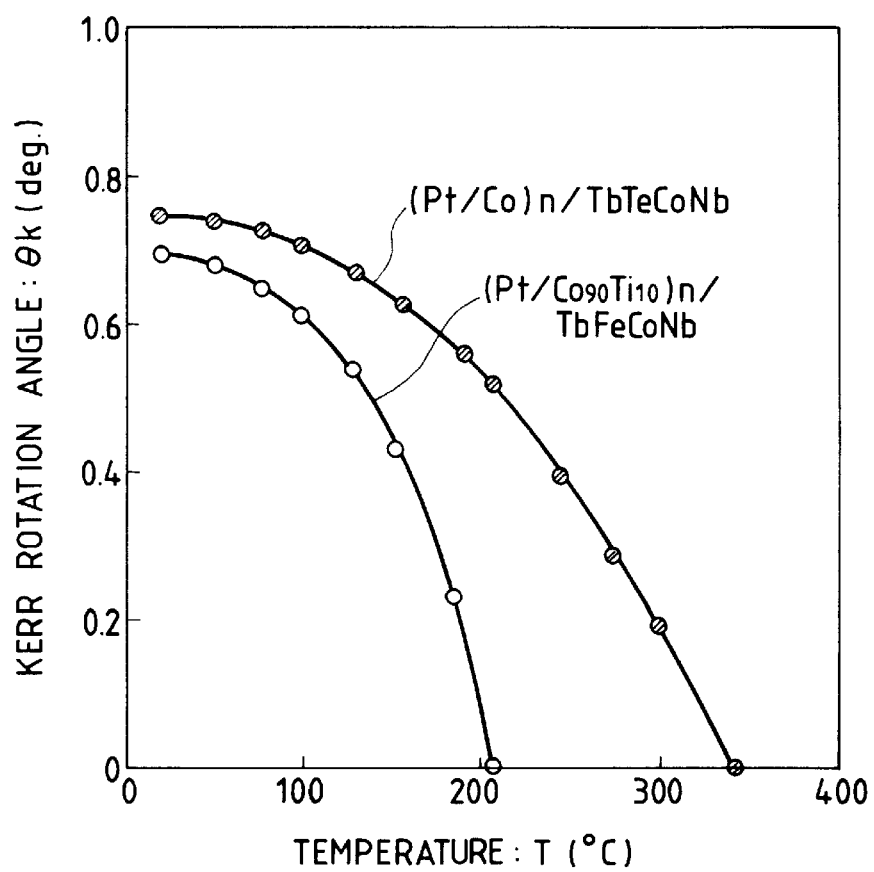
FIG. 22 shows temperature dependencies of the Kerr rotation angle.

The perpendicular magnetic energy of the magneto-optical recording layer prepared as described above was as high as $1 \times 10^6$ erg/cm², as governed by the TbFeCoNb layer. FIG. 22 is temperature dependencies of the Kerr rotation angle. The figure shows for comparison two characteristics of the alternately bonded layer of (Pt/Co)n having no Ti with TbFeCoNb and of the one having Ti. It can be found in the curves that the layer of (Pt/CoTi)n/TbFeCoNb had the Curie temperature around 200°C, while that of (Pt/Co)n/TbFeCoNb had it around 340°C. This means that the addition of Ti could control the Curie temperature.

Similar effect could be obtained by using a single or a plurality of elements, including Pt, Pd, Rh, Au, Nb, Ta, and Cr, in place of Ti. It also could be attained by replacing Co by Fe or FeCo alloy. It further could be made by replacing Pt by Pd, Rh, Au, or an alloy of these. Further more, Tb of the rare earth-iron group alloy layer 20 could be replaced by Ho, Dy, or Gd.

The magnetic characteristics could be controlled as desired by adjusting the magnetic characteristics of the rare earth-iron group alloy layer 20 with the alternately laminated multi-layer structure of Pt and CoX in which X is Nb, Ti, Ta, Cr, Pt, Pd, Rh, or Au.

A feature of the present invention is to magnetically couple the two layers, one is the recording layer having a greater magneto-optical effect to short wave lights but lower perpendicular magnetic energy than $10^4$ J/m³, and the other is the perpendicularly magnetized layer having a greater perpendicular magnetic energy than $10^5$ J/m³ but worse in the wavelength characateristics of the magneto-optical effect. This is advantageous in that the one can make up the defects of the other. The resulted magneto-optical recording medium can have not only greater perpendicular magnetic energy, but also greater magneto-optical effect even for the short wave lights. This leads to accomplishment of the magneto-optical recording disk capable of recording at ultra high density.

Another feature of the present invention relates to no interference among pits as the recording layer having greater magneto-optical effect to short wave lights can have magnetic field modulation or light intensity modulation to record. The recording domains can be made smaller than 0.3 μm, allowing high density recording. If an additional pit-edge recording is made, this can further increase the recording density. In addition to this, the magnetic field modulation allows over-write.

An additional feature of the present invention relates to addition of another element into the iron group element in the alternately laminated layer of the noble metal element and iron group element. This can increase the perpendicular magnetic energy, decrease the saturated magnetization, and increase the coersive force so that data storage reliability can be increased.

It is another feature of the present invention to select a desired concentration of the added element to control the Curie temperature and the temperature magnetic characteristics. This allows selection of desired performance characteristics of the disk, such as the recording sensitivity. As a result, the disk and drive system provide the highest performance.

What is claimed is:

1. A magneto-optical recording medium comprising in combination:

a magneto-optical recording layer capable of writing or erasing information by a laser beam and an external magnetic field and of reading the information by a Kerr effect; and a substrate having the magneto-optical recording layer formed thereon;

characterized in that:

the magneto-optical recording layer has at least two layers including a first magneto-optical recording layer and a second magneto-optical recording layer which are magnetically coupled together;

the first magneto-optical recording layer is a layer providing a greater magneto-optical effect in a short light wavelength range than the second magneto-optical recording layer though that having less perpendicular magnetic energy than this, as is provided on an irradiation side of the laser beam;

the first magneto-optical recording layer is not thicker than 500 Angstrom and is provided adjacent the substrate, and the second magneto-optical recording layer is provided on the first magneto-optical recording layer; and the first and second magneto-optical recording layers are thick in total not to transmit the light in use for reading.

2. A magneto-optical recording medium set forth in claim 1, characterized in that:

the first magneto-optical recording layer is formed of a material having less perpendicular magnetic energy than $10^5$ J/m³.

3. A magneto-optical recording medium set forth in claim 1, characterized in that:

the second magneto-optical recording layer is formed of a material having greater perpendicular magnetic energy than $10^5$ J/m³.

4. A magneto-optical recording medium set forth in claim 1, characterized in that:

the first magneto-optical recording layer is an alloy of at least one element selected from among Pd, Pt, and Rh with at least one element selected from among Fe, Co, Ni, and Mn.

5. A magneto-optical recording medium set forth in claim 1, characterized in that:

the first magneto-optical recording layer is of multi-layer structure, wherein a layer of at least one element selected from among Pd, Pt, and Rh and the other layer of at least one element selected from among Fe, Co, Ni, and Mn are laminated alternately.

6. A magneto-optical recording medium set forth in claim 1, characterized in that:

the first magneto-optical recording layer is an alloy of at least one element selected from among Nd, Pr, Sm, and Ce with at least one element selected from among Fe and Co.

7. A magneto-optical recording medium set forth in claim 1, characterized in that:

the first magneto-optical recording layer is of multi-layer structure, wherein a layer of at least one element selected from among Nd, Pr, Sm, and Ce and the other layer of at least one element selected from among Fe and Co are laminated alternately.

8. A magneto-optical recording medium set forth in claim 1, characterized in that:

the second magneto-optical recording layer is an alloy of at least one element selected from among Tb, Dy, Gd, and Ho with at least one element selected from among Fe and Co.

9. A magneto-optical recording medium set forth in claim 1, characterized in that:

the second magneto-optical recording layer is of multi-layer structure, wherein a layer of at least one element selected from among Tb, Dy, Gd, and Ho and the other layer of at least one element selected from among Fe and Co are laminated alternately.

10. A magneto-optical recording medium set forth in claim 1, characterized in that:

the second magneto-optical recording layer is an alloy of at least one element selected from among Tb, Dy, Gd, and Ho, with at least one element selected from among Fe and Co, and with at least one element selected from among Nb, Ti, Ta, Cr, Pt, Pd, and Rh.

11. A magneto-optical recording medium set forth in claim 1, characterized in that:

the second magneto-optical recording layer is of multi-layer structure, wherein a layer of at least one element selected from among Tb, Dy, Gd, and Ho, another layer of at least one element selected from among Fe and Co, and the other layer of at least one element selected from among Nb, Ti, Ta, Cr, Pt, Pd, and Rh are laminated alternately.

12. A magneto-optical recording medium set forth in claim 1, characterized in that:

the first magneto-optical recording layer has a platinum group element and an iron group element laminated alternately, wherein a layer thickness ratio of the platinum group element to the iron group element is 2 to 1 to 5 to 1.

13. A magneto-optical recording medium set forth in claim 12, characterized in that:

the layer thickness ratio of the platinum group element to the iron group element is 4 to 1.

14. A magneto-optical recording medium set forth in claim 12, characterized in that:

a layer of the iron group element is not thicker than 10 Angstrom.

15. A magneto-optical recording medium set forth in claim 1, further comprising:

a recording layer having a large reflective index and having a magneto-optical effect which is large as light wavelength is shorter, provided on a side of the second magneto-optical recording layer opposite to the other side facing the first magneto-optical recording layer.

16. A magneto-optical recording medium comprising in combination:

a magneto-optical recording layer capable of writing or erasing information by a laser beam and an external magnetic field and of reading the information by a Kerr effect; and a substrate having the magneto-optical recording layer formed thereon;

characterized in that:

the magneto-optical recording layer has at least two layers, including a first magneto-optical recording layer and a second magneto-optical recording layer which are magnetically coupled together;

the first magneto-optical recording layer is a layer providing a greater magneto-optical effect in a short light wavelength range than the second magneto-optical recording layer though that having less perpendicular magnetic energy than this, as is provided on an irradiation side of the laser beam;

the first magneto-optical recording layer is not thicker than 500 Angstrom and is provided adjacent the substrate, and the second magneto-optical recording layer is provided on the first magneto-optical recording layer; and the first and second magneto-optical recording layers are thick in total enough to be able to transmit the light in use for reading.

17. A magneto-optical recording medium set forth in claim 16, characterized in that:

the first magneto-optical recording layer is formed of a material having less perpendicular magnetic energy than $10^5$ J/m$^3$.

18. A magneto-optical recording medium set forth in claim 16, characterized in that:

the second magneto-optical recording layer is formed of a material having greater perpendicular magnetic energy than $10^5$ J/m$^3$.

19. A magneto-optical recording medium set forth in claim 16, characterized in that:

the first magneto-optical recording layer is an alloy of at least one element selected from among Pd, Pt, Au and Rh with at least one element selected from among Fe, Co, Ni, and Mn.

20. A magneto-optical recording medium set forth in claim 16, characterized in that:

the first magneto-optical recording layer is of multi-layer structure, wherein a layer of at least one element selected from among Pd, Pt, and Rh and the other layer of at least one element selected from among Fe, Co, Ni, and Mn are laminated alternately.

21. A magneto-optical recording medium set forth in claim 16, characterized in that:

the first magneto-optical recording layer is an alloy of at least one element selected from among Nd, Pr, Sm, and Ce with at least one element selected from among Fe and Co.

22. A magneto-optical recording medium set forth in claim 16, characterized in that:

the first magneto-optical recording layer is of multi-layer structure, wherein a layer of at least one element selected from among. Nd, Pr, Sm, and Ce and the other layer of at least one element selected from among Fe and Co are laminated alternately.

23. A magneto-optical recording medium set forth in claim 16, characterized in that:

the second magneto-optical recording layer is an alloy of at least one element selected from among Tb, Dy, Gd, and Ho with at least one element selected from among Fe and Co.

24. A magneto-optical recording medium set forth in claim 16, characterized in that:

the second magneto-optical recording layer is of multi-layer structure, wherein a layer of at least one element selected from among Tb, Dy, Gd, and Ho and the other layer of at least one element selected from among Fe and Co are laminated alternately.

25. A magneto-optical recording medium set forth in claim 16, characterized in that:

the second magneto-optical recording layer is an alloy of at least one element selected from among Tb, Dy, Gd, and Ho, with at least one element selected from among Fe and Co, and with at least one element selected from among Nb, Ti, Ta, Cr, Pt, Pd, and Rh.

26. A magneto-optical recording medium set forth in claim 16, characterized in that:

the second magneto-optical recording layer is of multi-layer structure structure, wherein a layer of at least one element selected from among Tb, Dy, Gd, and Ho, another layer of at least one element selected from among Fe and Co, and the other layer of at least one element selected from among Nb, Ti, Ta, Cr, Pt, Pd, and Rh are laminated alternately.

27. A magneto-optical recording medium set forth in claim 16, characterized in that:

the first magneto-optical recording layer has a platinum group element and an iron group element laminated alternately, wherein a layer thickness ratio of the platinum group element to the iron group element is 2 to 1 to 5 to 1.

28. A magneto-optical recording medium set forth in claim 27,, characterized in that:

the layer thickness ratio of the platinum group element to the iron group element is 4 to 1.

29. A magneto-optical recording medium set forth in claim 27, characterized in that:

a layer of the iron group element is not thicker than 10 Angstrom.

30. A magneto-optical recording medium set forth in claim 16, further comprising:

a recording layer having a large reflective rate and having a magneto-optical effect which is large as light wavelength is shorter, provided on a side of the second magneto-optical recording layer opposite to the other side facing the first magneto-optical recording layer.

31. A magneto-optical recording medium comprising in combination:

a magneto-optical recording layer capable of writing or erasing information by a laser beam and an external magnetic field and of reading the information by a Kerr effect; and a substrate having the magneto-optical recording layer formed thereon;

characterized in that:

the magneto-optical recording layer has at least two layers, including a first magneto-optical recording layer and a second magneto-optical recording layer which are magnetically coupled together;

the first magneto-optical recording layer is a layer providing a greater magneto-optical effect in a short light wavelength range than the second magneto-optical recording layer though that having less perpendicular magnetic energy than this, as is provided on an irradiation side of the laser beam;

the first magneto-optical recording layer is not thicker than 500 Angstrom and is provided adjacent the substrate, and the second magneto-optical recording layer is provided on the first magneto-optical recording layer; and the first magneto-optical recording layer is a multi-layer structure which has two layers laminated alternately, including a layer formed of at least one element selected from among Pt, Pd, Rh, and Au and the other layer of alloy of at least one base element selected from among Fe, Co, Ni, and Mn containing at least one element selected from among Pt, Pd, Rh, Au, Nb, Ti, Ta, and Cr.

32. A magneto-optical recording medium set forth in claim 31, further comprising:

an alloy layer or an alternately laminated layer composed of a rare earth element or elements and an iron group element or elements, being provided so as to magnetically couple with the multi-layer structure.

33. A magneto-optical recording medium set forth in claim 31, characterized in that:

the rare earth elements include at least one element selected from among Tb, Dy, Ho, and Gd; and The iron group elements include at least one element selected from among Fe and Co.

34. A magneto-optical recording medium set forth in claim 31, characterized in that:

concentration of an element added to Fe, Co, Ni, or Mn is controlled to control a magnetic characteristics of the recording medium;

in the alternately laminated multi-layer structure composed of the alloy layers of at least one element selected from among Fe, Co, Ni, and Mn containing at least one element selected from among Pt, Pd, Rh, Au, Nb, Ti, Ta, and Cr and the other layer of at least one element selected from among Pt, Pd, Rh, and Au, or in the alternately laminated multi-layer structure having the layer magnetically coupled thereto according to claim 32 or 33.

35. A magneto-optical recording medium comprising in combination:

a magneto-optical recording layer capable of writing or erasing information by a laser beam and an external magnetic field and of reading the information by a Kerr effect; and a substrate having the magneto-optical recording layer formed thereon;

characterized in that:

the magneto-optical recording layer has at least two layers including a first magneto-optical recording layer and a second magneto-optical recording layer which are magnetically coupled together;

the first magneto-optical recording layer is a layer providing a greater magneto-optical effect in a short light wavelength range than the second magneto-optical recording layer though that having less perpendicular magnetic energy than this, as is provided on an irradiation side of the laser beam;

the first magneto-optical recording layer is not thicker than 500Angstrom and is Provided adjacent the substrate, and the second magneto-optical recording layer is provided on the first magneto-optical recording layer; and the second magneto-optical recording layer is a recording layer having the perpendicular magnetic thickness direction thereof.

36. A magneto-optical recording method for recording information with use of a magneto-optical recording medium comprising in combination:

a magneto-optical recording layer capable of writing or erasing information by a laser beam and an external Magnetic field and of reading the information by a Kerr effect; and a substrate having the magneto-optical recording layer formed thereon;

characterized in that:

the magneto-optical recording layer has at least two layers including a first magneto-optical recording layer and a second magneto-optical recording layer which are magnetically coupled together;

the first magneto-optical recording layer is a layer providing a greater magneto-optical effect in a short light wavelength range than the second magneto-optical recording layer though that having less perpendicular magnetic energy than this as is provided on an irradiation side of the laser beam;

the first magneto-optical recording layer is not thicker than 500 Angstrom and is provided adjacent the substrate, and the second magneto-optical recording layer is provided on the first magneto-optical recording layer; and the first and second magneto-optical recording layers are thick in total not to transmit the light in use for reading: and characterized in that:

the laser beam is irradiated continuously; and a switching magnetic field is applied externally.

37. A magneto-optical recording method for recording information with use of a magneto-optical recording medium comprising in combination:

a magneto-optical recording layer capable of writing or erasing information by a laser beam and an external magnetic field and of reading the information by a Kerr effect; and a substrate having the magneto-optical recording layer formed thereon;

characterized in that:

the magneto-optical recording layer has at least two layers, including a first magneto-optical recording layer and a second magneto-optical recording layer which are magnetically coupled together;

the first magneto-optical recording layer is a layer providing a greater magneto-optical effect in a short light wavelength range than the second magneto-optical recording layer though that having less perpendicular magnetic energy than this, as is provided on an irradiation side of the laser beam;

the first magneto-optical recording layer is not thicker than 500 Angstrom and is provided adjacent the substrate, and the second magneto-optical recording layer is provided on the first magneto-optical recording layer;

the first and second magneto-optical recording layers are thick in total not to transmit the light in use for reading; and the first and second magneto-optical recording layers are different in Curie temperature, compensation temperature, and coercive force: and characterized in that:

an auxiliary magnetic field is applied to the medium and a pulse laser beam or a laser beam intensity is modulated.

38. A magneto-optical recording medium comprising a substrate and a double-layered structure composed of a first layer which is provided on a light incident side, which preserves magnetically information and which is capable of reproducing said information by magneto-optical effect, and a second layer which is provided on an opposite side to said light incident side and which has greater perpendicular magnetic energy than said first layer, said first layer and said second layer being magnetically coupled with each other to increase coercive force and magneto-optical effect; wherein the first layer is not thicker than 500 Angstroms and is provided adjacent the substrate and the second layer is provided on the first layer.

39. A magneto-optical recording medium as set forth in claim 38, wherein said first layer comprises a multi-layered structure composed of a lamination comprised of one layer made of at least one element selected from the group consisting of Pd, Pt, and Rh and another layer made of at least one element selected from the group consisting of Fe, Co, Ni and Mn.

40. A magneto-optical recording medium as set forth in claim 38 wherein said second layer comprises a multi-layered structure composed of a lamination comprised of one layer made of at least one element selected from the group consisting of Tb, Dy, Gd and Ho and another layer made of at least one element selected from the group consisting of Fe and Co.

41. A magneto-optical recording medium as set forth in claim 38, wherein said second layer comprises a multi-layered structure composed of a lamination comprised of one layer made of at least one element selected from the group consisting of Tb, Dy, Gd and Ho and another layer made of at least one element selected from the group consisting of Fe and Co.

\* \* \* \* \*